United States Patent [19]

Kamio et al.

[11] Patent Number: 5,406,486
[45] Date of Patent: Apr. 11, 1995

[54] VEHICLE WHEEL SLIP CONTROL SYSTEM USING PREDICTIVE MODEL TO ESTIMATE FRICTION COEFFICIENT

[75] Inventors: Shigeru Kamio, Nagoya; Mitsuo Hara, Aichi; Hitoshi Tasaka, Chiryu; Katsuya Sakita, Obu; Mitsunori Takao, Kariya, all of Japan

[73] Assignee: Nippondenso Co., Ltd., Kariya, Japan

[21] Appl. No.: 133,388

[22] Filed: Oct. 8, 1993

[30] Foreign Application Priority Data

Oct. 9, 1992 [JP] Japan ................. 4-271920

[51] Int. Cl.⁶ .............. B60T 8/32; B60K 31/00
[52] U.S. Cl. .................... 364/426.03; 364/436.02; 303/104; 180/197
[58] Field of Search ............... 364/426.03, 426.01, 364/426.02; 180/197, 233; 303/93, 95, 97, 99, 104, 113.2; 73/9

[56] References Cited

U.S. PATENT DOCUMENTS

| | | | |
|---|---|---|---|
| 4,721,176 | 1/1988 | Kabasin et al. | 180/197 |
| 4,722,411 | 2/1988 | Ohashi et al. | 180/197 |
| 4,855,916 | 8/1989 | Bernard | 364/426.02 |
| 4,933,857 | 6/1990 | Hashiguchi et al. | 364/426.02 |
| 4,947,332 | 8/1990 | Ghoneim | 364/426.03 |
| 5,012,417 | 4/1991 | Watanabe et al. | 364/426.02 |
| 5,018,596 | 5/1991 | Kodama | 180/233 |
| 5,069,302 | 12/1991 | Kageyama | 180/197 |
| 5,117,934 | 6/1992 | Tsuyama et al. | 364/426.01 |
| 5,249,851 | 10/1993 | Johnsen | 303/104 |
| 5,275,474 | 1/1994 | Chin et al. | 303/94 |

FOREIGN PATENT DOCUMENTS

| | | |
|---|---|---|
| 63-18144 | 1/1988 | Japan . |
| 63-32136 | 2/1988 | Japan . |
| 63-149236 | 6/1988 | Japan . |
| 63-263243 | 10/1988 | Japan . |
| 1-122763 | 5/1989 | Japan . |
| 2-19622 | 1/1990 | Japan . |

Primary Examiner—Gary Chin
Assistant Examiner—Tan Q. Nguyen
Attorney, Agent, or Firm—Cushman, Darby & Cushman

[57] ABSTRACT

A vehicle slip control system for controlling a wheel slip based on a friction coefficient of a road surface measures an engine torque $T_E$ by applying an intake pipe negative pressure Pm and a number of engine revolutions Ne to an engine model. A drive torque T is measured by applying the engine torque $T_E$ to an A/T model, and a driving wheel acceleration dω is obtained by finding a difference of a detected driving wheel speed ω. By filtering this driving wheel acceleration dω, a post-filter driving wheel acceleration $dω_0$ is calculated. A squat force Ws is calculated from the drive-torque T and the post-filter driving wheel acceleration dω, and a friction coefficient μ of the road surface is estimated from the squat force Ws. The estimated friction coefficient μ is used to control a wheel slip.

9 Claims, 27 Drawing Sheets

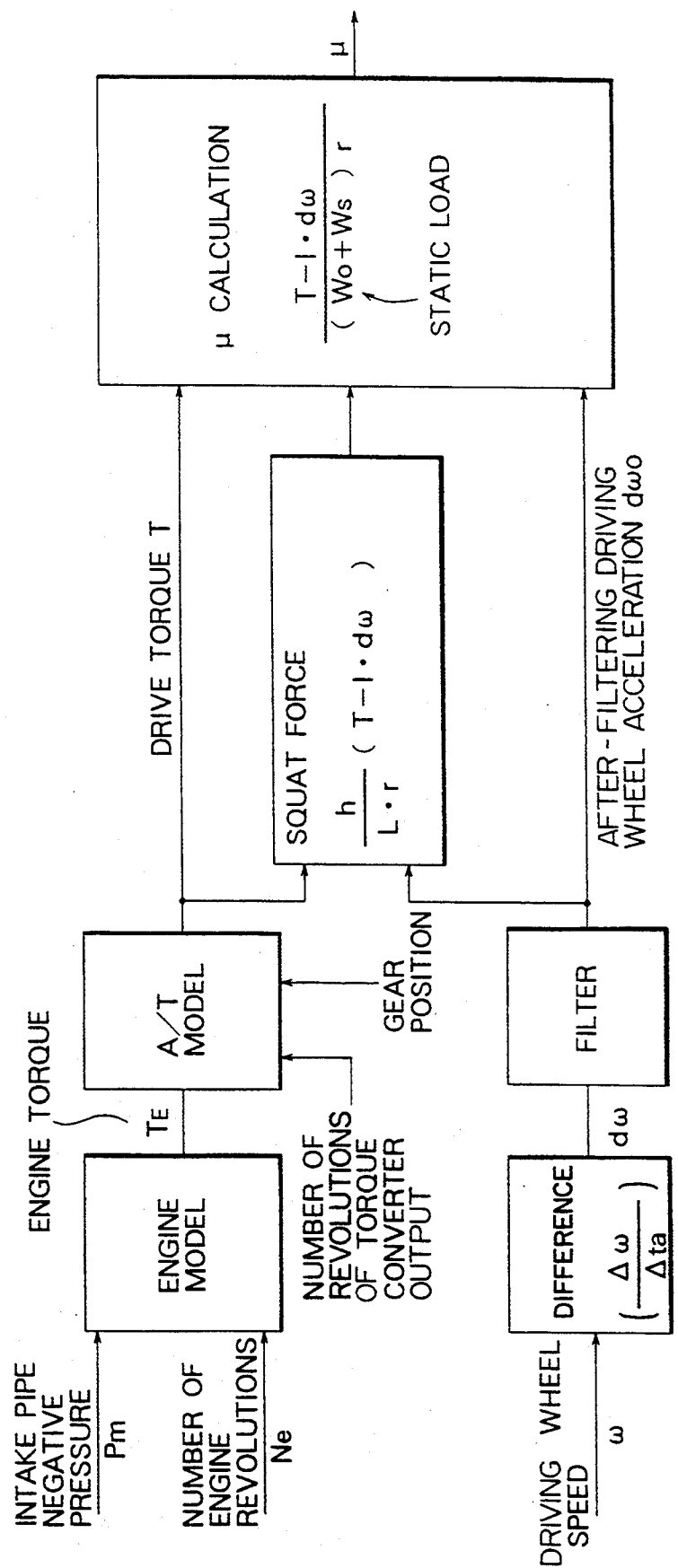

VEHICLE WHEEL SLIP CONTROL SYSTEM USING PREDICTIVE MODEL TO ESTIMATE FRICTION COEFFICIENT

BACKGROUND OF THE INVENTION

1. Field of the Invention

This invention relates to a vehicle slip control system for restraining an excessive slip of driving wheels of the vehicle which occurs during starting acceleration of the vehicle, for example.

2. Description of the Related Art

In JP-A-62-121839, for example, there are shown types of systems for controlling a position of a blade of throttle valve so that the slip ratio $S=(Va-Vb)/Va$, determined by a vehicle speed $Vb$ obtained from driving wheels and a driving wheel speed $Va$, stays within a predetermined range in the event of a slip of the driving wheels.

There are also known techniques for restraining a wheel slip by limiting an engine torque by stopping a fuel supply to an internal combustion engine on the vehicle or by delaying the ignition timing (JP-A-63-263243 and U.S. Pat. No. 4,721,176). Furthermore, there have been proposed techniques for adjusting the throttle position, for example, according to a steering angle or the like to prevent slippage during turning (JP-A-63-18144, JP-A-63-149236, and JP-A-63-32136).

In the arrangements disclosed in the above-mentioned patent publications, it is often impossible to provide a suitable control over the engine torque to be controlled in the event of slippage because the engine torque differs with different road conditions (e.g., snowy roads, icy roads) expressed by a friction coefficient $\mu$ between the road surface and the driving wheels and also differs with the kind of the tire.

In the so-called traction control to prevent a wheel slip, the optimum torque restraint rate (by throttle control, for example) at the time of slippage differs with the friction coefficient of the road surface, and therefore, in order to exert control with an adequate torque regardless of the road condition, it is necessary to know the friction coefficient $\mu$ and perform traction control according to this friction coefficient. In the prior arts, however, an adequate friction coefficient $\mu$ cannot be estimated.

To take an example, in a technique disclosed in JP-A-2-19622, the friction coefficient $\mu$ of the road surface is estimated from the acceleration of the driving wheels in the event of slippage. However, in this technique, since the drive wheel torque is deemed constant, it sometimes occurs that the variations of the actual drive wheel torque are reflected in the above estimated friction coefficient $\mu$ of road surface, making it impossible to estimate a correct friction coefficient $\mu$.

JP-A-1-122763 discloses a method for estimating the friction coefficient of a road surface which takes the drive torque of the driving wheels into account, but this method does not consider a road pressing force of the driving wheels, so that it is difficult to estimate an accurate friction coefficient of the road surface.

SUMMARY OF THE INVENTION

An object of the present invention is to provide a vehicle slip control system for accurately estimating the friction coefficient of a road surface to thereby limit a wheel slip.

Another object of the present invention is to provide a vehicle slip control system for adequately limiting a slip of the driving wheels during acceleration at starting of the vehicle to thereby achieve a stable acceleration at starting.

Yet another object of the present invention is to provide a vehicle slip control system for supplying a drive wheel torque in accord with the friction coefficient of the road surface to achieve a stable acceleration at starting.

According to the present invention, there is provided a vehicle slip control system, mounted on a vehicle which runs by rotating the driving wheels in contact with the road surface, for controlling a slip of the driving wheels, comprising: friction calculation means for calculating a friction coefficient of the road surface by taking into account the variation in the road pressing force of the driving wheels; and vehicle slip control means for controlling a slip of the driving wheels in accord with the friction coefficient of road surface calculated by the friction calculation means.

The friction calculation means of the vehicle slip control system according to the present invention may include a squat force detecting means for detecting a squat force which varies the load to the driving wheels during acceleration of the vehicle, and calculating the friction coefficient of a road surface based on the detected squat force.

The vehicle slip control system according to the present invention is capable of accurately estimating the friction coefficient of a road surface, adequately controlling slippage of the vehicle and stabilizing starting acceleration of the vehicle.

BRIEF DESCRIPTION OF THE DRAWINGS

FIG. 3 is a flowchart showing a procedure for estimating a friction coefficient in the system of the present invention;

DESCRIPTION OF THE PREFERRED EMBODIMENTS

Preferred embodiments of the present invention will be described.

Before describing the embodiments, operation expressions used in the embodiment will first be described.

Figure 2:
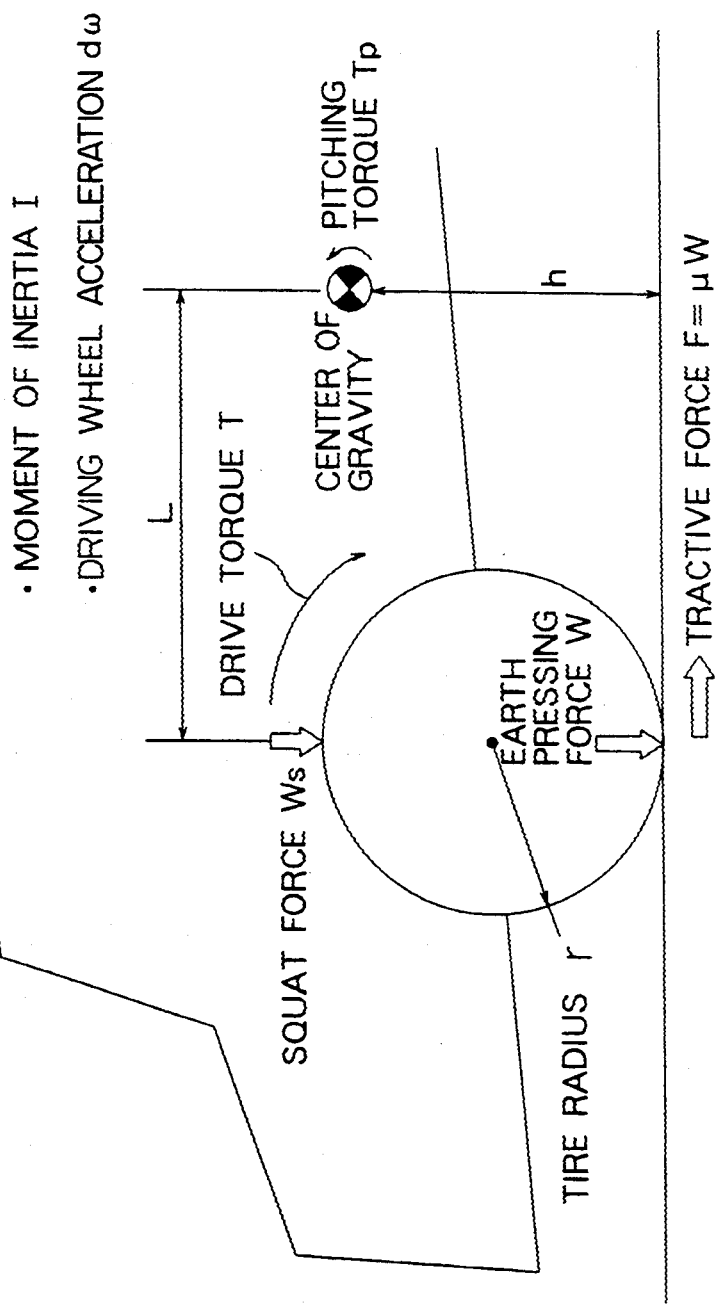
FIG. 2 is a diagram for explaining forces applied to the vehicle.

FIG. 2 is a diagram for explaining a balance of forces related to the driving wheel by using a model. The drive torque T of the driving wheels is a sum of an acceleration torque $I \cdot d\omega$ as a product of a moment of inertia I related to the tire and a driving wheel acceleration $d\omega$ and a moment $F \cdot r$ as a product of a tractive force F and a tire radius r, and this drive torque is given by the following equation (1).

$$T = I \cdot d\omega + F \cdot r \quad (1)$$

The tractive force F is a product of a friction coefficient $\mu$ and an earth pressing force W, and is given by the following equation (2).

$$F = \mu \cdot W \quad (2)$$

Eliminating the tractive forces F from the equations (1) and (2), we have equation (3) as shown below:

$$\mu = (T - I \cdot d\omega)/(W \cdot r) \quad (3)$$

where an earth pressing force W is given as a sum of the static load Wo, a squat force Ws, and an unsprung vertical vibration component $W_B$ owing to the tire or the like.

The calculation of the squat force Ws will be described.

As shown in the following equation and FIG. 2, the squat force Ws is a product of a pitching torque Tp and a reciprocal of a distance L from the center of gravity to the axle, and the pitching torque Tp is given by a product of a height h to the center of gravity and a tractive force $\mu W$.

$$Ws = Tp/L = h \cdot \mu W/L \quad (4)$$

Based on the above-mentioned equation (3), the squat force Ws can be obtained by an equation (5):

$$Ws = h(T - I \cdot d\omega)/(L \cdot r) \quad (5)$$

Regarding the earth pressing force W in the equation (3) as a sum of the static load Wo and the squat force Ws by neglecting the vertical vibration component $W_B$ and substituting the equation (5) into the equation (3), an equation (6) can be obtained.

$$\mu = (T - I \cdot d\omega)/(Wo \cdot r + (h/L)(T - I \cdot d\omega)) \quad (6)$$

For convenience in the calculation in embodiments to be described, by setting $(T - I \cdot d\omega) = A$, a following equation (7) can be obtained.

$$\mu = A/(Wo \cdot r + (h/L)A) \quad (7)$$

On the other hand, the unsprung vertical vibration component $W_B$ owing to the tire or the like is not a component representing the vehicle behavior, and therefore, should desirably be removed for highly accurate control.

For this reason, as shown in FIG. 3, the acceleration (the post-filter driving wheel acceleration) from which the acceleration corresponding to the unsprung natural frequency component has been removed by filtering the detected acceleration $d\omega$ is used for calculating the friction coefficient.

The acceleration $d\omega$ of the driving wheels can be obtained by finding a difference of the detected driving wheel speed $\omega$, in other words, by dividing a change $\Delta\omega$ of the driving wheel speed $\omega$ by a predetermined time $\Delta ta$ during which that change occurred.

The vertical vibration component $W_B$ is expressed by the following equation (8), in which equation the unsprung natural vibration $f_B$ is expressed by the following equation (9). Therefore, the unsprung natural vibration $f_B$ is removed in advance by filtering.

$$W_B = A \sin 2\pi f_B t \quad (8)$$

$$f_B = (k_2/m_2)^{\frac{1}{2}}/2\pi \quad (9)$$

where $k_2$ is a tire vertical spring constant and $m_2$ is an unsprung load.

Therefore, as the unsprung natural frequency $f_B$ to be removed by filtering, about 12 Hz, for example, should preferably be adopted. In order to remove this unsprung natural frequency $f_B$, a band-pass filter to remove only a band of 10 to 30 Hz may be used. It is also possible to use a value of acceleration which need not be subject to filtering as the acceleration used for estimation of the friction coefficient $\mu$, though this method has to allow for a little decrease of accuracy.

Accordingly, the friction coefficient $\mu$ of the road surface can be estimated by performing the operations of the equations (6) and (7) after removing the vertical vibration $W_B$ by the filtering process.

Description will now be made of a method for estimating the friction coefficient $\mu$ of road surface by detecting with a height sensor the sinkage of the driving wheel when accelerating the vehicle, and obtaining the earth pressing force from the detected sinkage.

By regarding the body support construction as a parallel construction of springs and dampers, the earth pressing force W is given by the following equation (10).

$$W = k \cdot x + c \cdot dx \qquad (10)$$

where k is a spring constant, x is the sinkage (variation), c is the dashpot constant, and dx is the change rate of the sinkage.

Under the condition that the sinkage in acceleration is constant, the dashpot effect can substantially be neglected, and what is more, $W = W_o + W_s$ can be set. Therefore, from the equation (10), the following equation (11) can be obtained.

$$W_s = k \cdot x - W_o \qquad (11)$$

On the other hand, from the equation (12) and the equation (13), the latter being derived from the equation (4), the drive force F and the squat force Ws can be obtained, and therefore, by the equation (14) obtained from those two equations, the friction coefficient $\mu$ of a road surface can be given.

$$F = \mu(W_o + W_s) \qquad (12)$$

$$W_s = (h/L)F \qquad (13)$$

$$\mu = L/h(1 + W_o/W_s) \qquad (14)$$

Figure 5A:
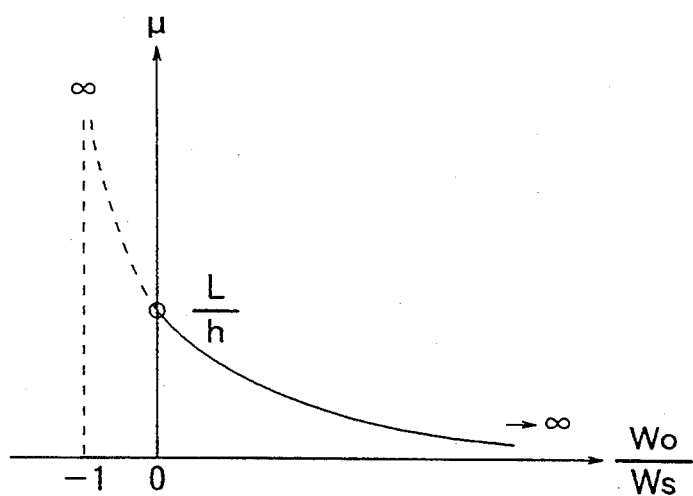
FIG. 5A is a diagram showing a relation of a friction coefficient $\mu$ with a ratio of a static load $Wo$ to a squat force $Ws$.
Figure 5B:
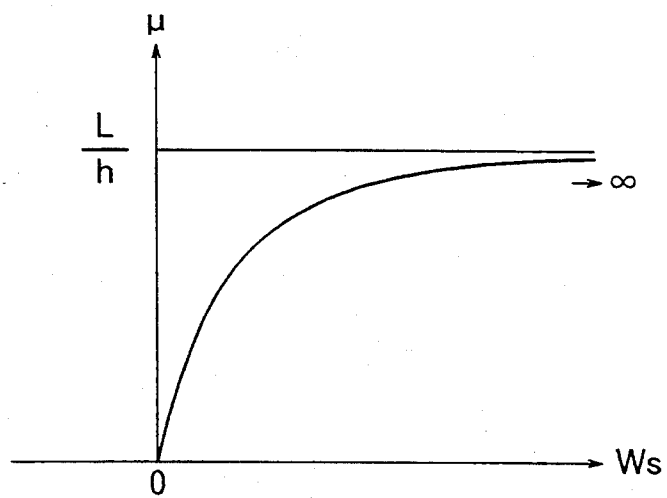
FIG. 5B is a diagram showing a relation of the friction coefficient $\mu$ with the squat force $Ws$.

Transformed into graphs, the equation (14) can be represented as shown in FIG. 5A or 5B. So, if FIG. 5B is expressed in a map or the like, the friction coefficient $\mu$ is easily obtained from the squat force Ws.

Substituting the equation (11) into the equation (14), the equation (15) can be obtained.

$$\mu = L/h(1 + W_o/(k\,x - W_o)) \qquad (15)$$

Figure 30:
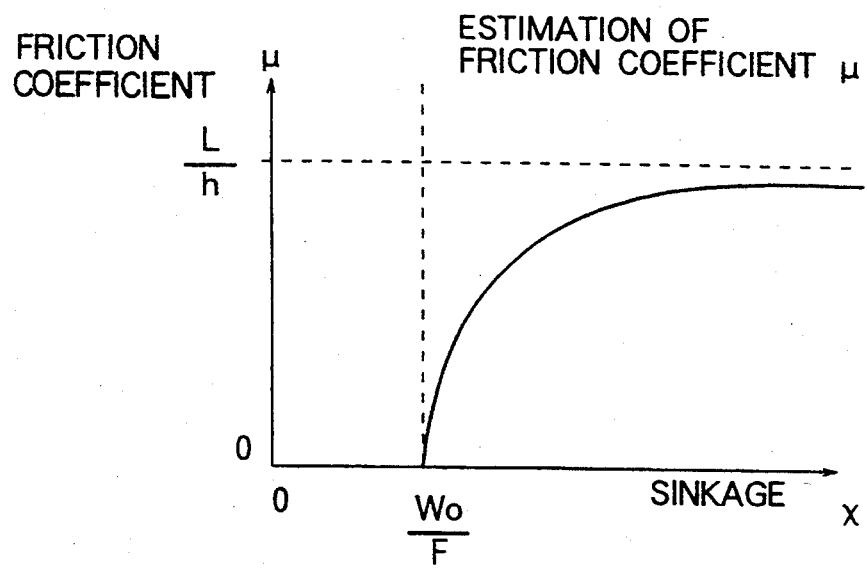
FIG. 30 shows a relation of the friction coefficient $\mu$ with a sinkage x.

FIG. 30 shows a relation of the friction coefficient $\mu$ with the sinkage expressed by the equation (15). By transforming FIG. 30 representing the equation (15) into a map, the friction coefficient $\mu$ can be obtained easily.

Figure 1:
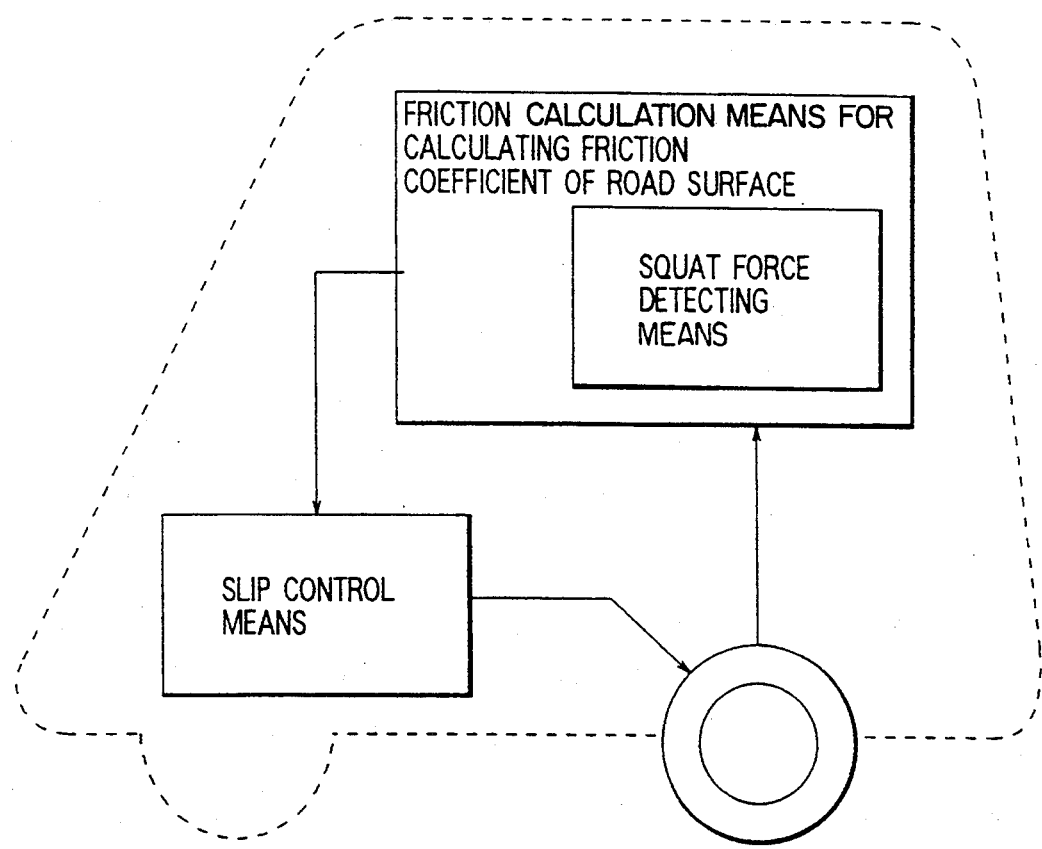
FIG. 1 is a basic construction diagram of an embodiment of the present invention.

The embodiments of the present invention will be next described with respect to the accompanying drawings. FIG. 1 is a schematic construction showing an embodiment of the vehicle slip control system according to the present invention. The vehicle slip control system for traction control in the first embodiment comprises friction calculation means for calculating the friction coefficient of road surface and slip control means, and when it detects a wheel slip, the calculating means estimates the friction coefficient $\mu$ of the road surface, and according to the estimated friction coefficient $\mu$, the slip control means controls the throttle opening angle, fuel cut-off, and spark-ignition timing, and in this way, the vehicle slip control system adjusts the vehicle slip ratio S so as to be in an adequate range to thereby control an excessive wheel slip.

Figure 6:
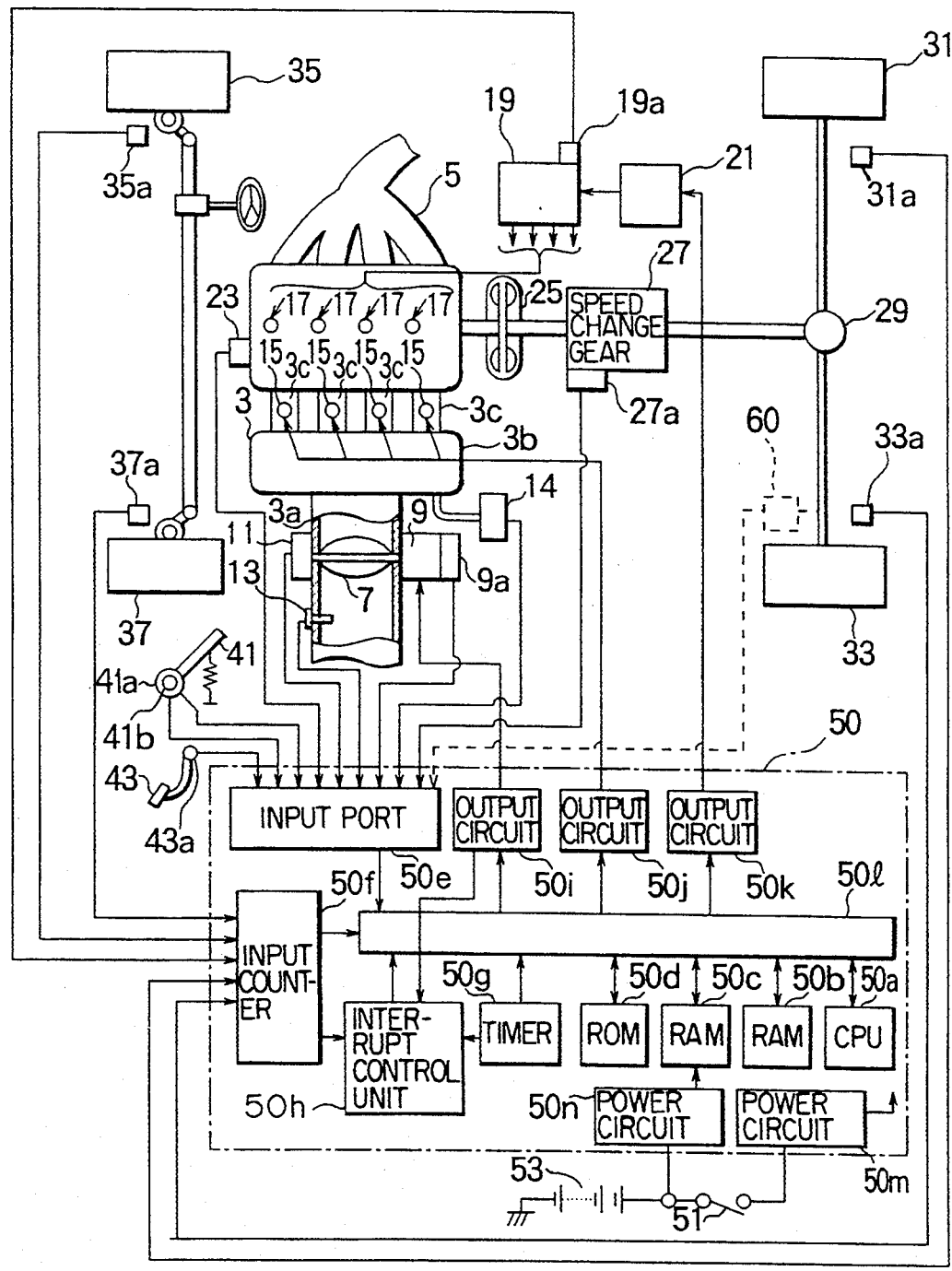
FIG. 6 is a block diagram showing a construction of a first embodiment.

FIG. 6 is a block diagram showing a construction of the first embodiment. As shown in FIG. 6, an internal combustion engine (hereafter referred to simply as the engine) 1 is a spark-ignition 4-cylinder gasoline engine mounted on a vehicle. The engine 1 is connected with an intake pipe 3 and an exhaust pipe 5. The intake pipe 3 includes a collecting portion 3a connected to an air cleaner, not shown, a surge tank 3b connected to the collecting portion 3a, and a manifold portion 3c extending from the surge tank 3b to the respective cylinders of the engine 1.

In the collecting portion 3a, there is provided a throttle valve 7 for adjusting the produced output of the engine 1 by controlling the intake air quantity supplied into the engine 1. The shaft of the throttle valve 7 is connected to an actuator 9 for adjusting the opening angle of the throttle valve 7 and a throttle sensor 11 for detecting the opening angle of the throttle valve 7.

An intake air temperature sensor 13 to detect the intake air temperature is provided on an upstream side of the throttle valve 7 in the collecting portion 3a.

An intake pipe pressure sensor 14 to detect the pressure in the intake pipe 3 is attached to the surge tank 3b. Each pipe of manifold portion 3c is provided with an electromagnetic fuel injection valve 15 to inject the fuel thereinto. In the engine 1, there are spark plugs 17 to ignite the fuel/air mixture in the respective cylinders. The spark plugs 17 are connected to a distributor 19 through high-voltage cords, and this distributor 19 is electrically connected to an igniter 21. A rotation sensor 19a to output signals in synchronism with engine rotation is attached to the distributor 19.

Also attached to the engine 1 is a water temperature sensor 23 to detect the temperature of cooling water to cool the engine 1.

The drive force produced in the engine 1 is transmitted through a speed change gear 27, a differential gear 29 and the like to right and rear wheels 31 and 33 serving as driving wheels. A gear position sensor 27a to output gear position signals corresponding to the gear positions is provided in the speed change gear 27. Wheel speed sensors 31a, 33a, 35a and 37a to detect the wheel rotation speeds are provided respectively for the right and left rear wheels 31 and 33, and a right front wheel 35 and a left front wheel 37 both serving as driven wheels.

Signals of the above-mentioned sensors, and signals of an accelerator operate amount sensor 41a to output a signal corresponding to the operated amount of an accelerator pedal 14, an accelerator full-inactivation sensor 41b to detect the state that the accelerator pedal 41 is released so that the accelerator mechanism is fully inactivated, and a brake sensor 43a which turns on when the brake pedal 43 is stepped on are input to an electronic control unit (ECU), which, according to those signals, outputs signals to drive the actuator 9, the injection valve 15, and the igniter 21.

The ECU 50 includes a CPU 50a to execute various arithmetic operations, a RAM 50b for temporarily storing data required for operations in CPU 50a, a RAM 50c for storing data which are required for operations in CPU 50a and need to be updated successively while the engine is running and maintained even after the key switch 51 of the vehicle is turned off, a ROM 50d having previously stored therein constants or the like used in the operation in CPU 50a, an input port 50e and an input counter 50f for inputting signals from the sensors, a timer 50g for measuring time, an interrupt control unit 50h for interrupting CPU 50a according to contents of data of the input counter 50f and the timer 50g, output circuits 50i, 50j and 50k for outputting signals to drive a stepping motor 9a, the injection valve 15, and the igniter 21, a bus line 501 serving as a data transmission line between the components of the ECU, a power circuit 50m, connected through the key switch 51 to a battery 53, for supplying electric power to the components other than RAM 50c, and a power circuit 50n, connected directly to RAM 50c, for supplying electric power to RAM 50c.

A control process executed by ECU 50 will be described.

Figure 7:
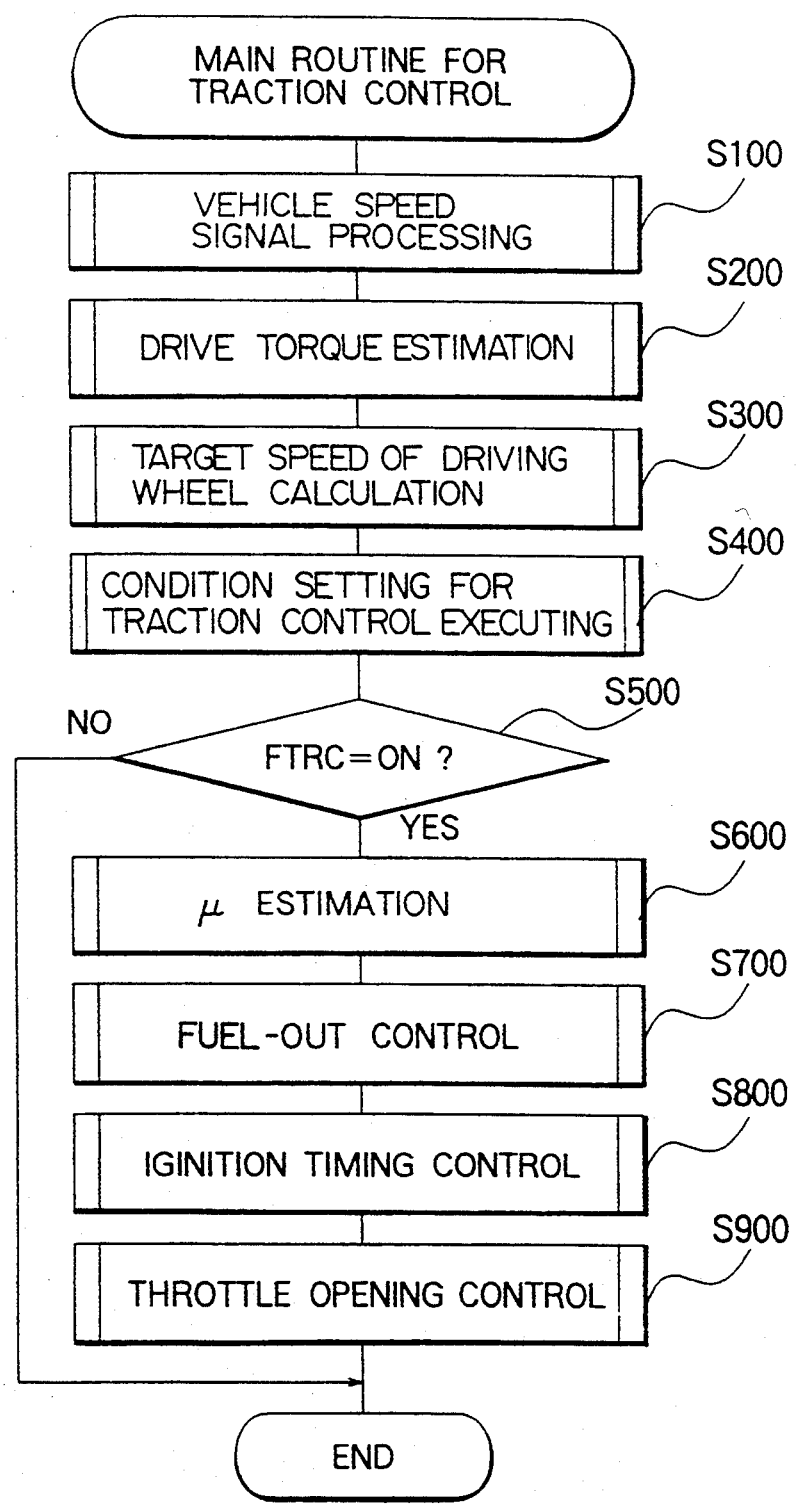
FIG. 7 is a flowchart showing a main routine for traction control in the first embodiment.

The main routine for traction control in this embodiment will be described with respect to FIG. 7.

At step S100, a vehicle signal process such as calculation of the driving wheel acceleration is executed, and at S200, the drive torque for the driving wheels is estimated. At the next S300, a target driving wheel speed is estimated, and at S400, a condition for traction execution such as setting or resetting a flag is established.

At S500, a decision is made whether or not to perform traction control according to the on/off state of the traction control flag FTRC. If the decision is "NO", this process is stopped tentatively, or if the decision is "YES", the process proceeds to S600.

At S600, the friction coefficient μ of the road surface is estimated, which is an essential operation in this embodiment. At S700, fuel cut control is performed. At S800, spark timing control is performed, and at S900, throttle valve control is executed. With this step, this process is finished tentatively.

Each process will be described in detail one after another.

Figure 8:
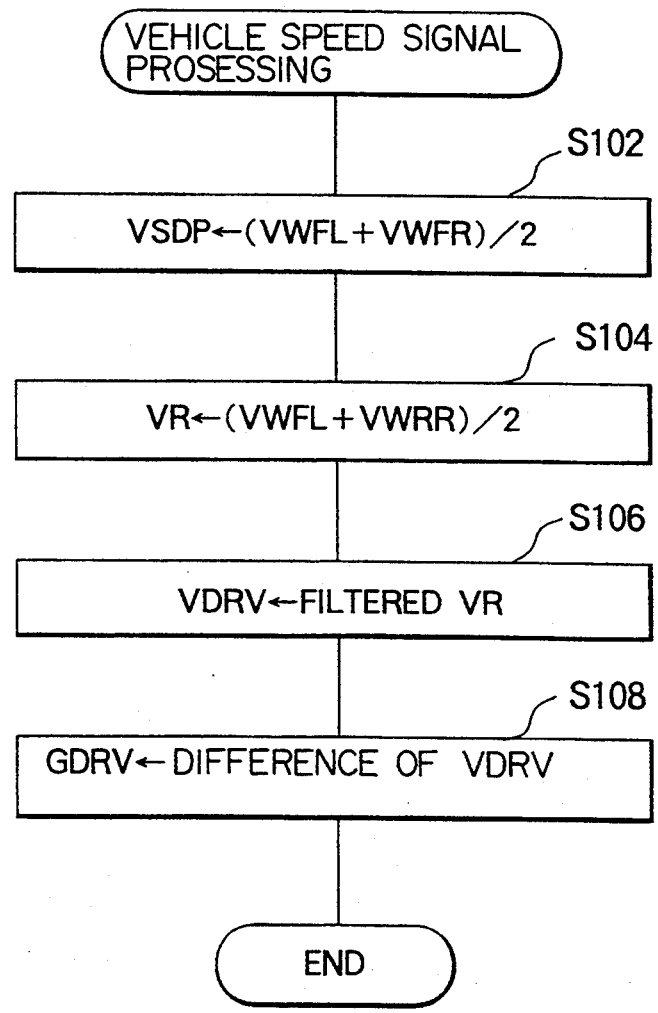
FIG. 8 is a flowchart showing a vehicle speed signal process in the first embodiment.

The vehicle speed signal process of S100 is described referring to the flowchart in FIG. 8.

The average of the speed VWFL of the driven left front wheel 37 and the speed VWFR of the driven right front wheel 35 is set as the vehicle speed VSPD.

At the next step S104, the average of the speed VWRL of the driving left rear wheel 33 and the speed VWRR of the right rear wheel 31 is set as the driving wheel speed VR.

At the subsequent step S106, the post-filter driving wheel speed VDRV is obtained by filtering the driving wheel speed VR to remove the effect of the vertical vibration owing to the tire. To be more specific, the filtering is performed with a notch filter capable of removing the acceleration component corresponding to the unsprung natural frequency $f_B$ (12 Hz, for example) obtainable by the equation (9) (i.e., capable of removing a band of 10 to 30 Hz).

At the subsequent step S108, by finding a difference of the post-filter driving wheel speed VDRV, the driving wheel acceleration GDRV is obtained, and with this step, the process is finished tentatively.

In other words, the steps S102 to S108 constitute a process for obtaining the vehicle speed VSPD and the driving wheel speed VR, and also the driving wheel acceleration GDRV from the post-filter driving wheel speed VDRV by filtering the driving wheel speed VR.

The process for estimating the drive torque at S200 mentioned above will be described referring to FIGS. 9 to 14. The drive torque estimation process divides into a main routine for the estimation, a gear ratio calculation process, an A/T correction factor calculation process, and a drive torque calculation process.

Figure 9:
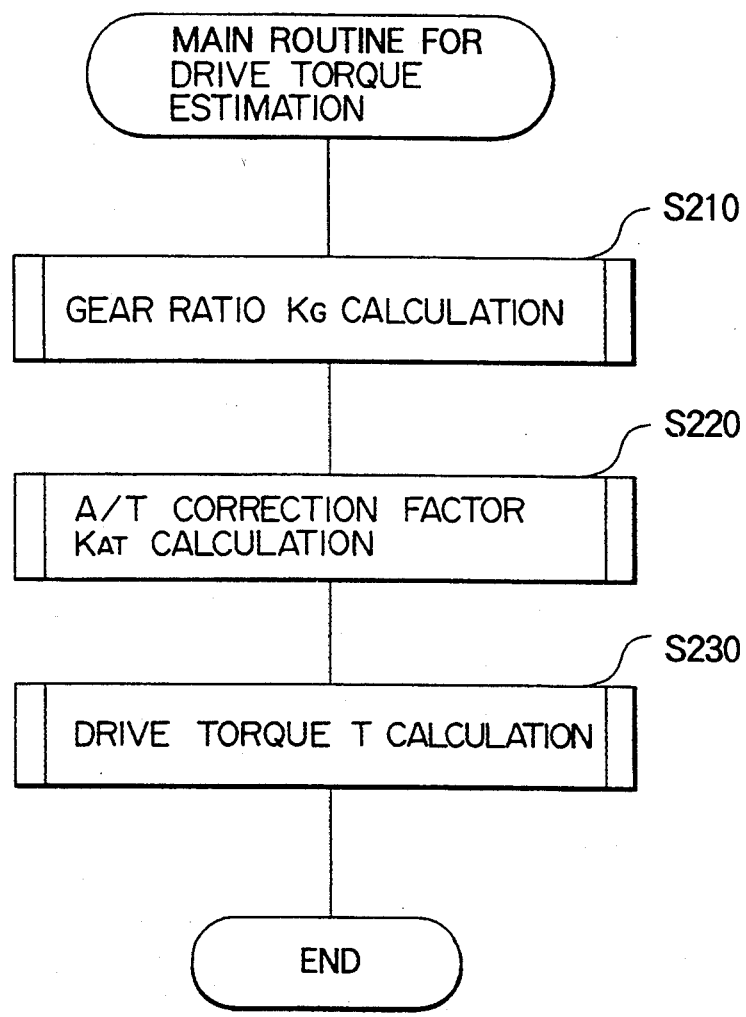
FIG. 9 is a flowchart showing a main routine for estimating a drive torque in the first embodiment.

Using the flowchart in FIG. 9, the main routine for drive torque estimation will be described.

At S210, a gear ratio $K_G$ is calculated, at S220 that follows, an A/T correction factor $K_{AT}$ is calculated, at S230, a drive torque T is calculated, with which step the process is finished tentatively.

The processes at S210 to S230 will be described next.

Figure 10:
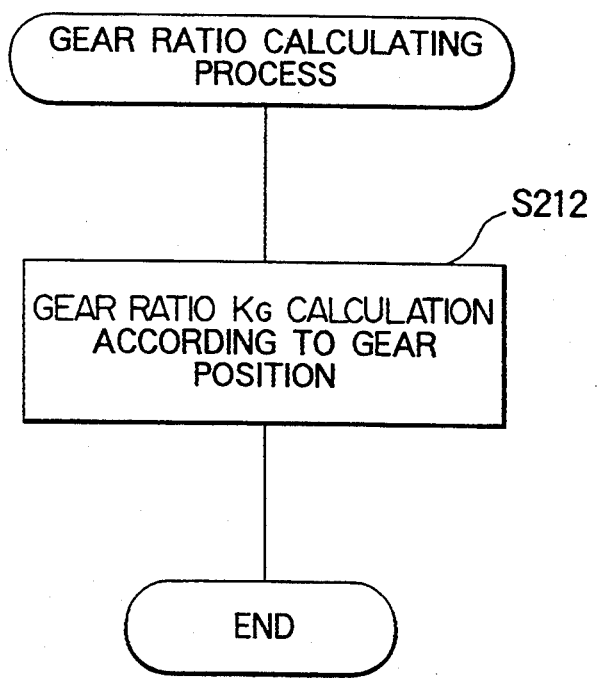
FIG. 10 is a flowchart showing a gear ratio calculating process in the first embodiment.

In the gear ratio calculation process of S210 shown in the flowchart in FIG. 10, at S212, from the gear position input from the gear position sensor 27a, an actual gear ratio $K_G$ is calculated, with which step this process is finished tentatively.

Figure 11:
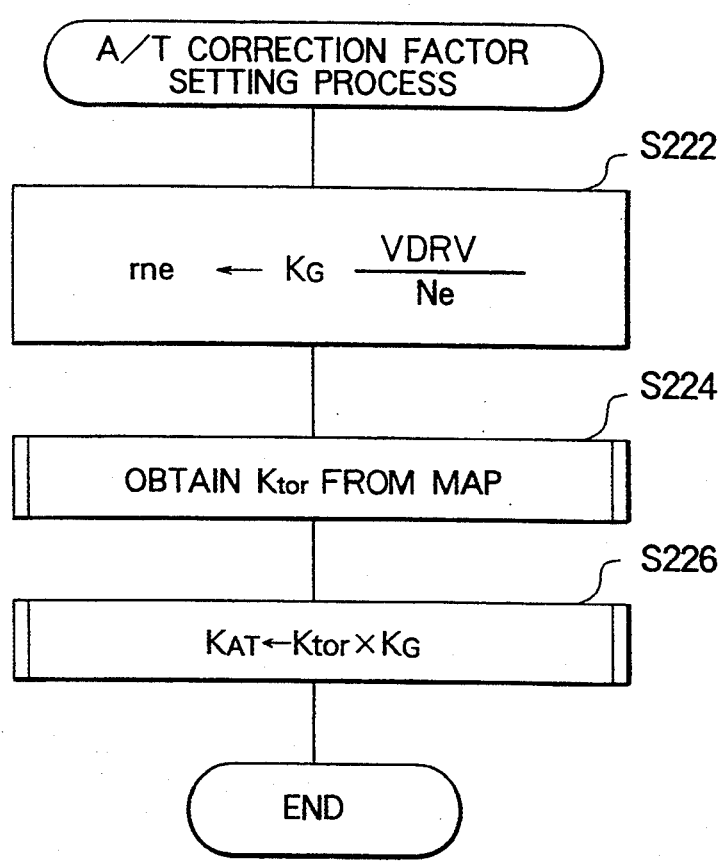
FIG. 11 is a flowchart showing an A/T correction factor setting process in the first embodiment.

In the A/T correction factor calculation process of S220 shown in the flowchart of FIG. 11, at S222, from the above-mentioned post-filter driving wheel speed VDRV, an engine number of revolutions Ne detected by the rotation sensor 19a, and the gear ratio $K_G$, a rotation number change rne between input and output of the torque converter 25 is obtained.

Figure 12:
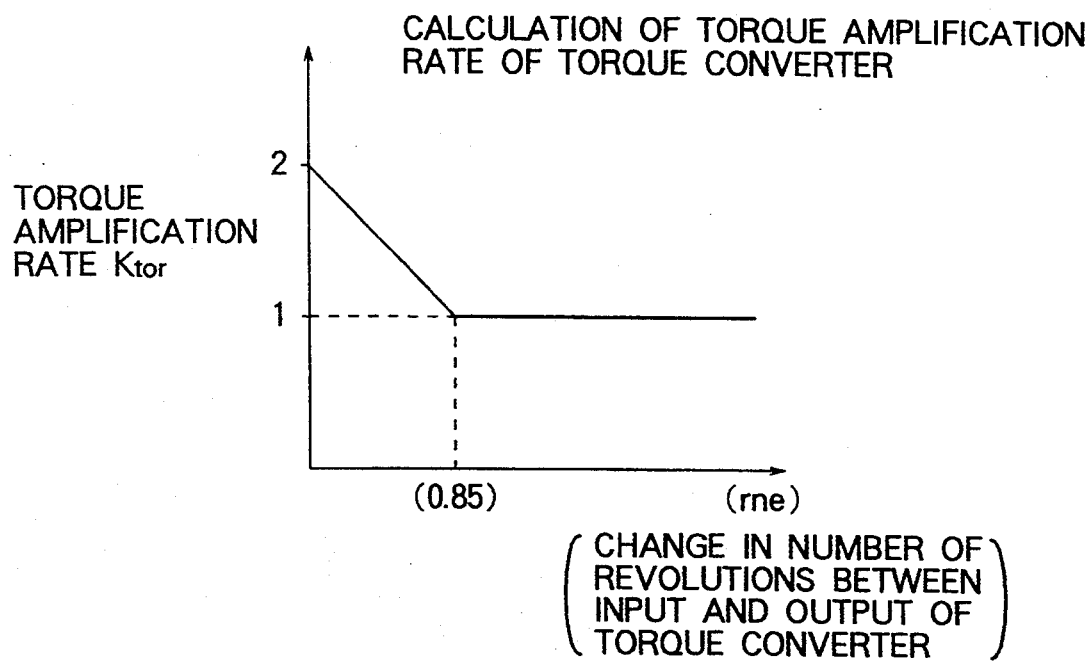
FIG. 12 is a graph corresponding to a map for calculating a torque amplification factor of a torque converter.

At the succeeding step S224, by using a map of the torque amplification factor Ktor and the rotation number change rne shown in FIG. 12, which map is prepared in advance, the torque amplification factor Ktor of the torque converter 25 is obtained in its relation to the rotation number change rne.

At S226, a product of the torque amplification factor Ktor and the gear ratio $K_G$ is set as the A/T correction factor $K_{AT}$, and with this step, the process is finished tentatively.

Figure 13:
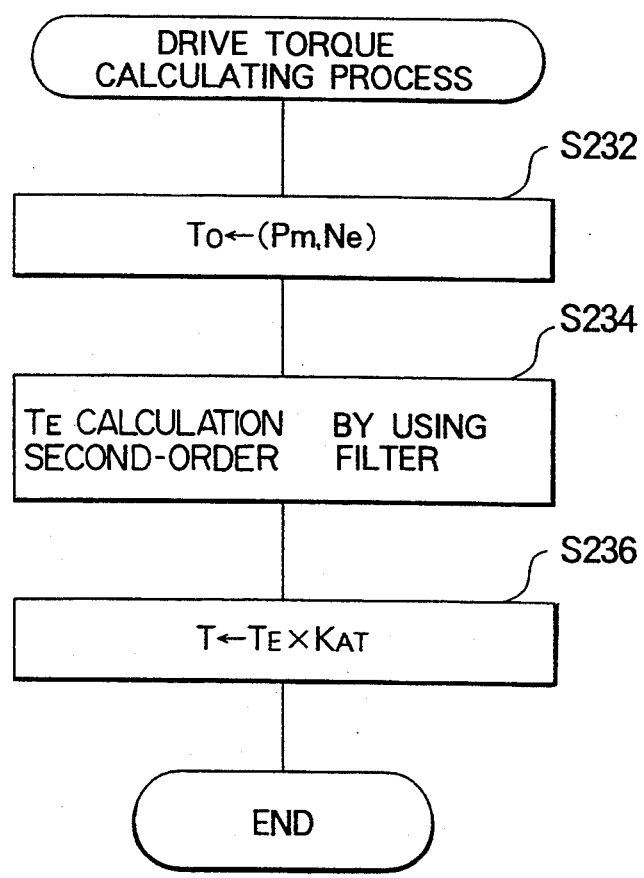
FIG. 13 is a flowchart showing a process for calculating a driving wheel torque.
Figure 14:
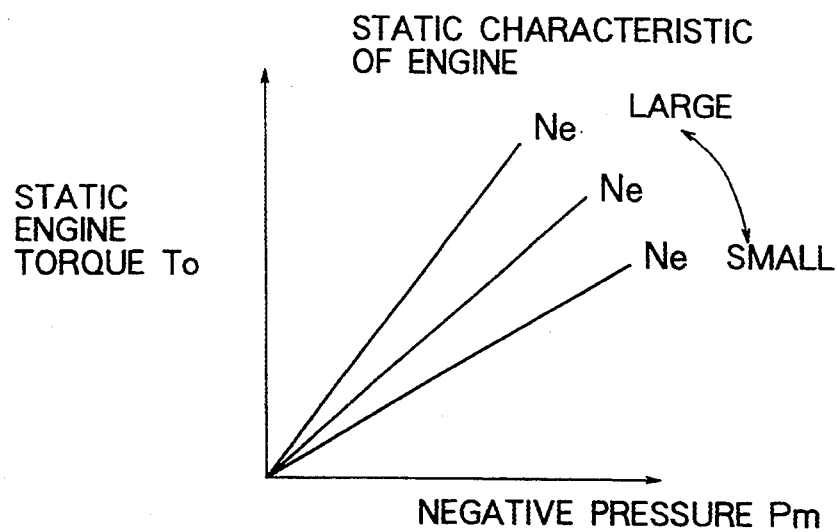
FIG. 14 is a graph corresponding to a map of engine static characteristics.

In the drive torque calculation process of S230 shown in the flowchart of FIG. 13, at S232, the static engine torque To is obtained based on the intake pipe negative pressure Pm, detected by the intake pipe pressure sensor 14, and the engine number of revolutions Ne by using a map of the static characteristic of the engine shown in FIG. 14. In FIG. 14, the larger the engine number of revolutions Ne, the greater the static engine torque To becomes under the condition that the intake pipe negative pressure Pm is the same.

At S234 that comes next, the dynamic engine torque $T_E$ is obtained by using a second-order filter for correcting a secondary delay.

At S236 that follows, a product of the dynamic engine torque $T_E$ and the A/T correction factor $K_{AT}$ is set as an actual drive torque T, and with this step, the process is finished tentatively.

The steps from S212 to S236 constitute the process for estimating the actual drive torque T by using the intake pipe negative pressure Pm, the engine number of revolutions Ne, the dynamic engine torque $T_E$, the torque amplification factor Ktor, the gear ratio $K_G$, and the post-filter driving wheel speed VDRV.

Figure 15:
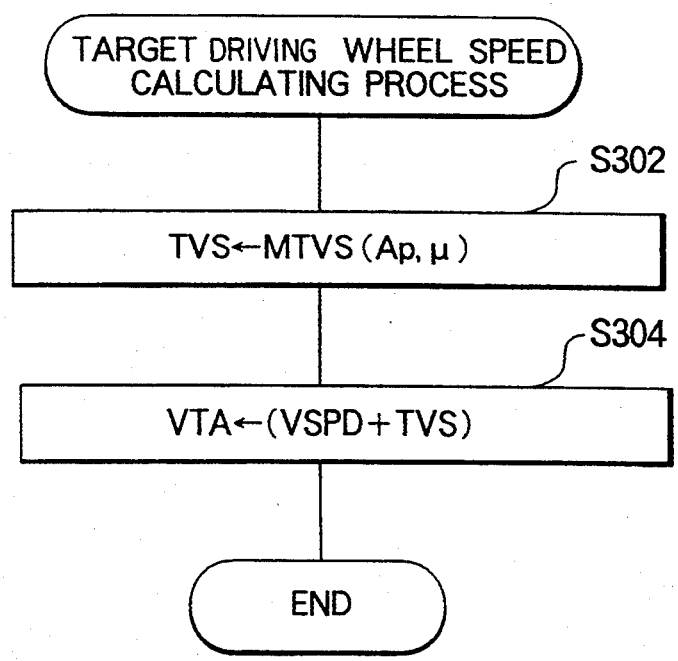
FIG. 15 is a flowchart showing a process for calculating a target driving wheel speed.

Using the flowchart of FIG. 15, the target driving wheel speed calculation process of S300 will be described next.

Figure 16:
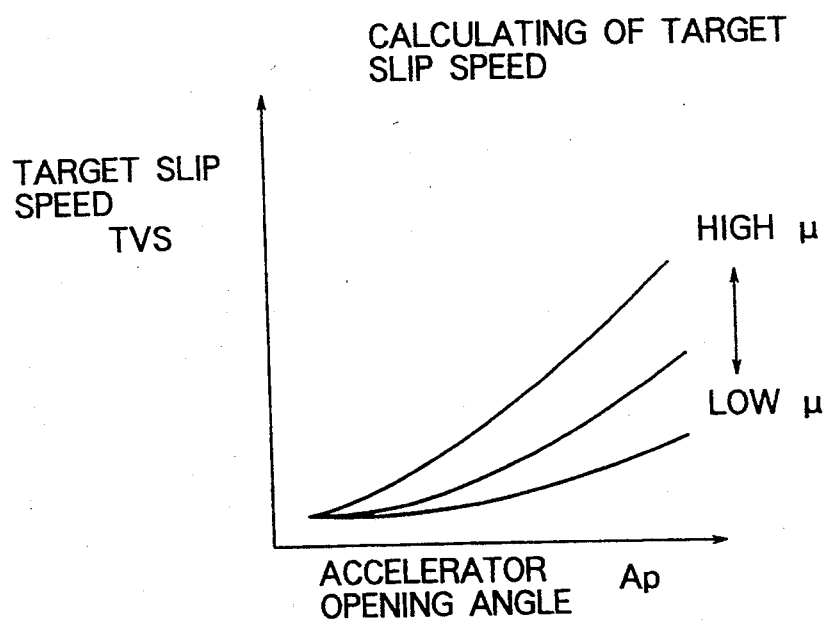
FIG. 16 is a graph corresponding to a map for calculating a target slip speed.
Figure 28:
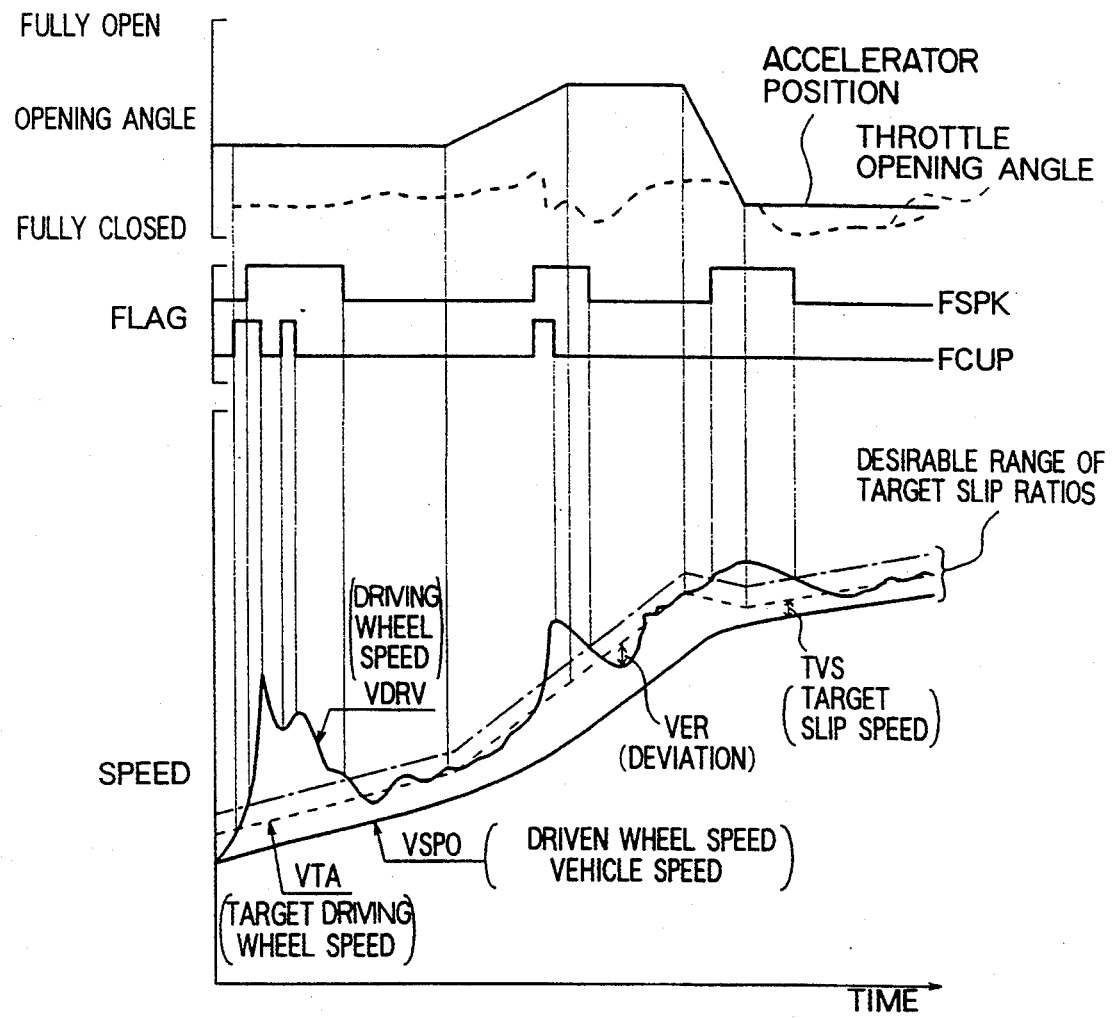
FIG. 28 is a graph showing driving wheel speed and others in actual control.

A step S302 is executed to find a target slip speed TVS as a deviation between the vehicle speed VSPD and the target driving wheel speed VTA as shown in FIG. 28. Using a target slip speed calculation map MTVS shown in FIG. 16, which is prepared in advance, the target slip speed TVS is obtained based on the accelerator position (throttle opening angle) Ap and the friction coefficient $\mu$ of a road surface. In FIG. 16, under the condition that the accelerator position Ap is the same, the target slip speed TVS is higher for a greater friction coefficient $\mu$. As the value of friction coefficient $\mu$ used for this step, a preset initial value or a previously estimated value is used.

At S304, the target driving wheel speed VTA is calculated by adding the vehicle speed VSPD with the target slip speed TVS—the target driving wheel speed for use as a target value such as to realize an adequate slip ratio S.

The steps S302 to S304 constitute the process for obtaining the target driving wheel speed VTA by using the target slip speed TVS obtained from the accelerator position Ap and a friction coefficient $\mu$ roughly predetermined.

Figure 17:
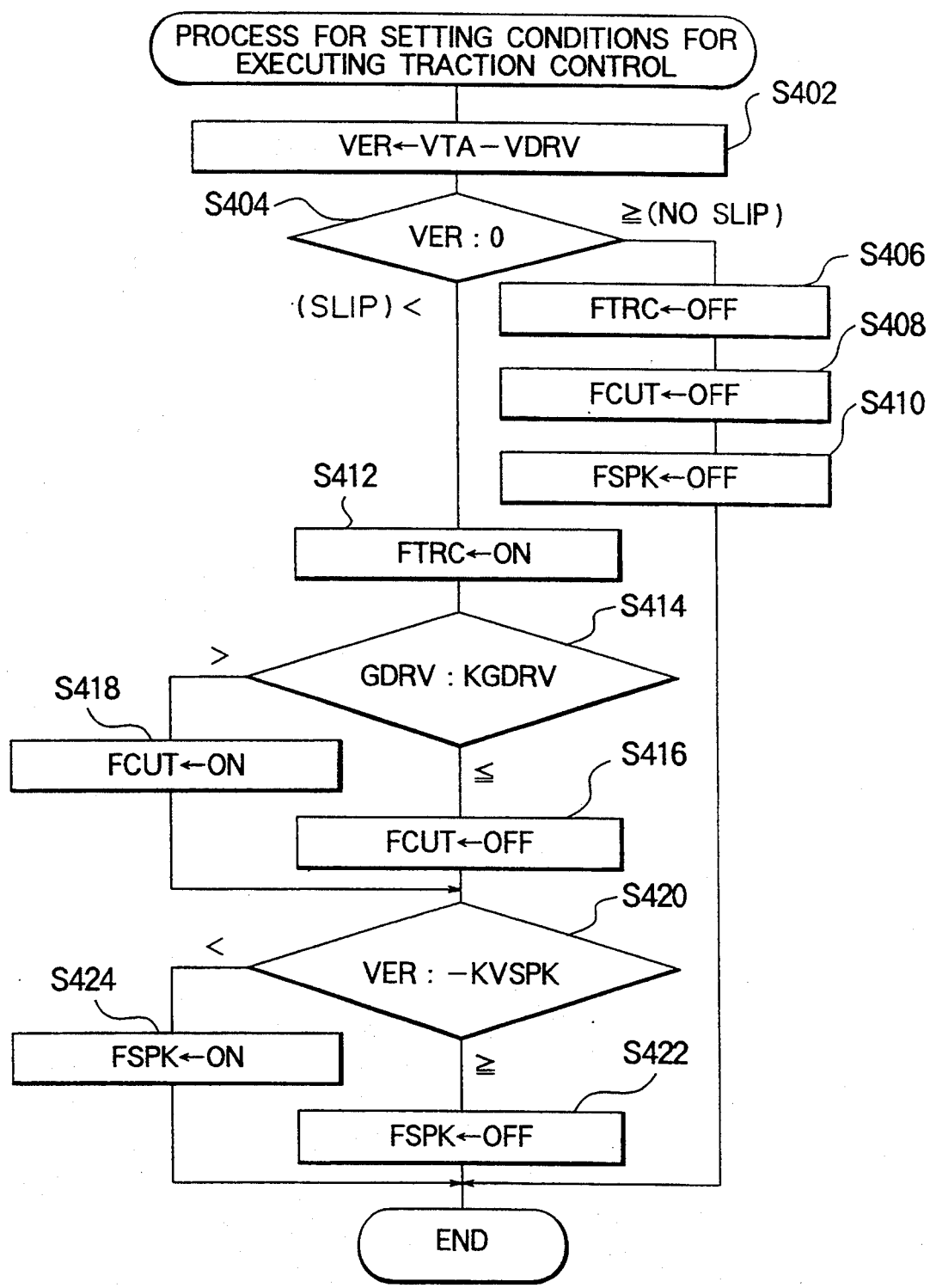
FIG. 17 is a flowchart showing a process for setting conditions for executing traction control.

Using the flowchart of FIG. 17, the traction executing condition setting process of S400 mentioned earlier will be described.

At S402, a difference (deviation) VER between the target and actual driving wheel speeds by subtracting the post-filter driving wheel speed VDRV from the target driving wheel speed VTA.

At the next step S404, a decision is made whether or not a slip is occurring by finding whether or not the driving wheel speed difference VER is larger than or equal to 0. To be more specific, if the target driving wheel speed VTA is greater than or equal to the actual driving wheel speed VDRV (if the decision is VER$\geq$0), a decision is made that a slip is not occurring. On the other hand, if the target driving wheel speed VTA is less than the actual driving wheel speed VDRV (if the decision is VER<0), this means that the driving wheels are rotating at excessively high speed, so that a decision is made that a slip is occurring.

In the steps S406 to S410 that are executed when a decision is made that a slip is not occurring, the flags of those steps are reset so as not to perform traction control. To be more specific, at S506, the flag (traction control flag) FTRC directing traction control to be executed is reset, then at S408, the flag (fuel cut flag) FCUT directing fuel cut to be done is reset, and at S410, the flag (spark-ignition timing flag) FSPK for directing spark-ignition timing control to be performed is reset, and with this step, the process is finished tentatively.

On the other hand, at S412 to which the process proceeds when the decision is that a slip is occurring, the traction control flag FTRC is set, and the process moves on to S414. The driving wheel acceleration GDRV is compared with the reference value KGDRV. If at this step a decision is made that the driving wheel acceleration GDRV is smaller than or equal to the reference value, in other words, if the decision is that the acceleration is slow, at S416 the fuel cut flag FCUT is reset. On the other hand, if the decision is that the driving wheel acceleration GDRV is greater than the reference value, in other words, if the decision is that the acceleration is too quick, at S418 the fuel cut flag FCUT is set.

In short, the process of S414 is executed to prevent an excessive speed increase of the driving wheels because too quick an acceleration causes a wheel slip.

At S420, a decision is made which of the paths to follow by comparing the difference VER (a negative value) of the driving wheel speeds with the reference value (−KVSPK) as the limit beyond which a wheel slip occurs. If at S420 a decision is made that the difference VER between the target and the actual driving wheel speeds is greater than or equal to the reference value (−KVSPK), that is, if the decision is that the speed deviation is small, at S422 the spark-ignition timing flag FSPK is reset. On the other hand, if at S420 a decision is made that the difference VER in driving wheel speed is smaller than the reference value (−KVSPK), that is, if the decision is that the speed deviation is large, at S424 the spark-ignition timing flag FSPK is set.

In other words, the steps S402 to S424 constitute the process of setting or resetting the traction control flag FTRC, the fuel cut flag FCUT, and the spark-ignition timing flag FSPK based on the decision of the difference VER between the target and the actual driving wheel speeds or the like.

With reference to the block diagram in FIG. 3, the procedure for estimating the friction coefficient $\mu$ of road surface, which is the essential operation of this embodiment will be described briefly.

The engine torque $T_E$ is obtained by applying the intake pipe negative pressure Pm and the engine number of revolutions Ne to an engine model, and by applying this engine torque $T_E$ to an A/T model, the drive torque T is obtained. On the other hand, the driving wheel acceleration d$\omega$ is obtained by finding a difference of the detected driving wheel speed $\omega$, and then the driving wheel acceleration d$\omega$ is filtered to obtain the post-filter driving wheel acceleration d$\omega_0$. Then, from the drive torque T and the post-filter driving wheel acceleration d$\omega_0$, the squat force Ws is obtained, and from the squat force Ws, the friction coefficient $\mu$ of the road surface is estimated.

With reference to the flowchart in FIG. 18, description will be made of the step for estimating the friction coefficient $\mu$ to which the process proceeds after a decision is made to execute traction control at S500.

Figure 18:
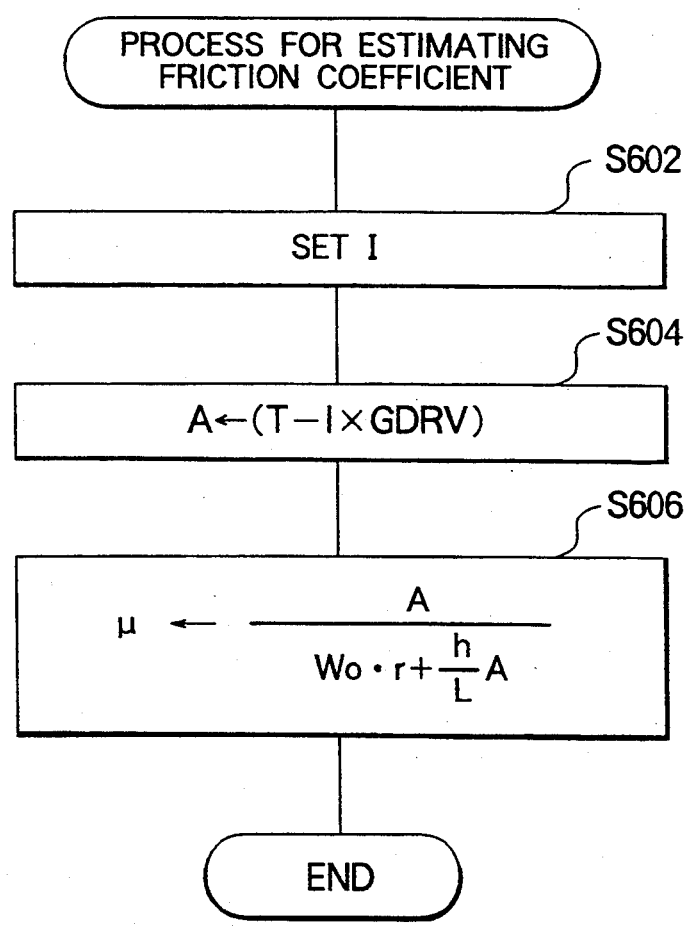
FIG. 18 is a flowchart showing a process for estimating a friction coefficient.

At S602 in FIG. 18, a moment of inertia I in the peripheral area of the tire is selected and set according to the tire size and the like, and at S604, a value A is obtained by subtracting a product of the moment of inertia I in the peripheral area of the tire and the post-filter driving wheel acceleration GDRV(d$\omega_0$) from the drive torque T.

At S606, the friction coefficient $\mu$ is calculated by selecting the equation (7) and using the value A obtained at S604, the static load on the driving wheels, the height h of the center of gravity, the distance L from the center of gravity to the axle, and the tire radius r.

Figure 19:
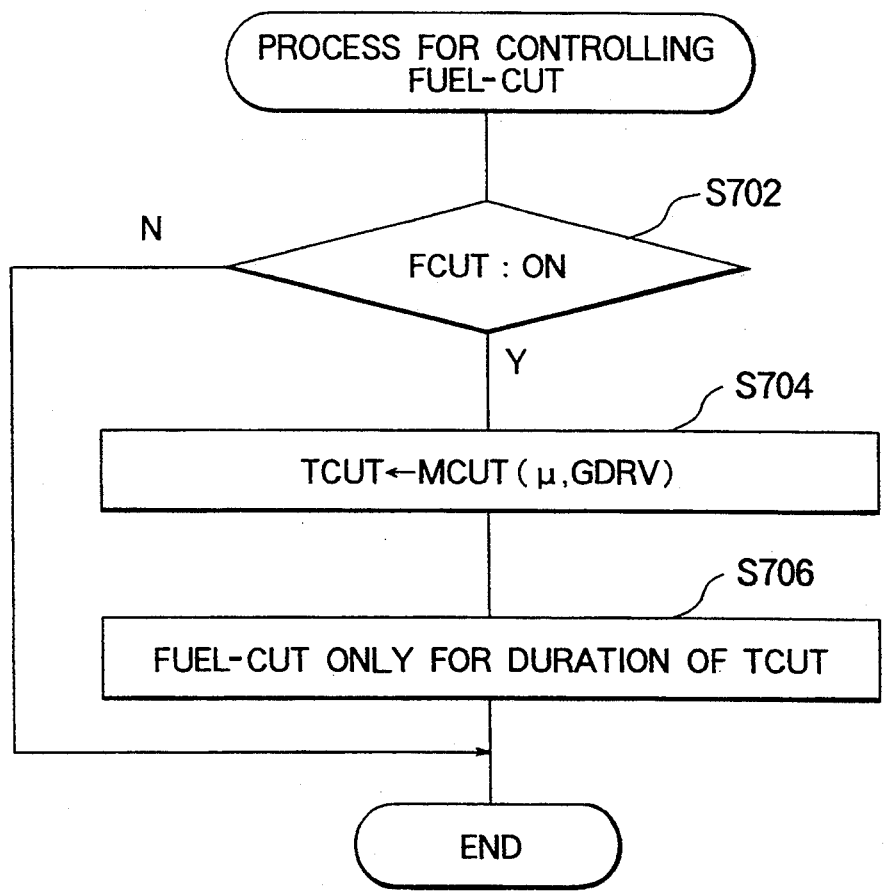
FIG. 19 is a flowchart showing a fuel cut control process.

The fuel cut process of S700 mentioned earlier will now be described with reference to the flowchart in FIG. 19.

At S702, a decision is made whether the fuel cut flag FCUT is on. If the decision is YES, the process proceeds to S704, or if the decision is NO, this process is finished tentatively.

Figure 20:
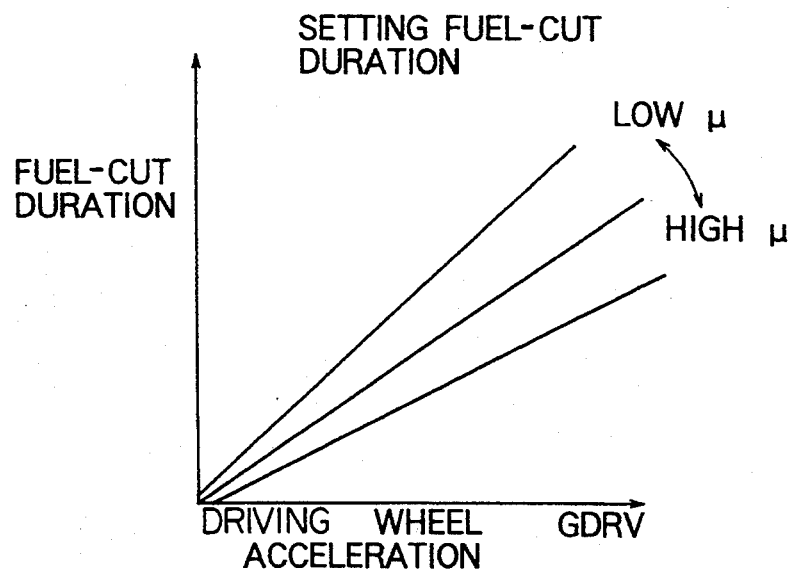
FIG. 20 is a graph corresponding to a map for setting a fuel cut duration.

At S704, the fuel cut duration is set based on the driving wheel acceleration GDRV and the friction coefficient $\mu$ of road surface by using a map MCUT for setting the fuel cut duration as shown in FIG. 20. In FIG. 20, the smaller the friction coefficient $\mu$, in other words, the higher the tendency towards slippage, the longer the fuel cut duration TCUT becomes.

At S706, the fuel is cut actually only for the fuel cut TCUT, and with this step, this process is finished tentatively.

Figure 21:
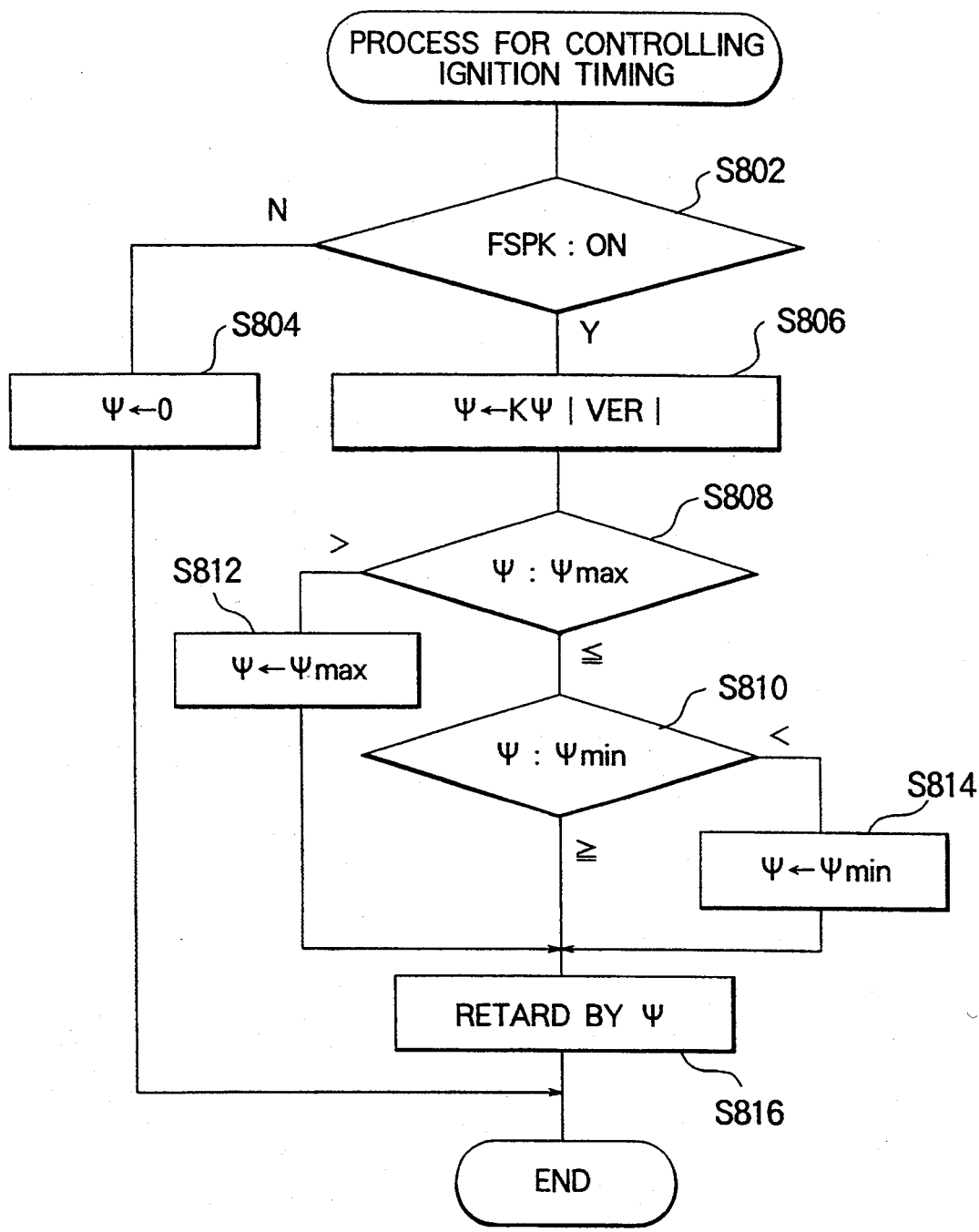
FIG. 21 is a flowchart showing a process of spark-ignition timing control.

Referring to the flowchart of FIG. 21, the spark-ignition timing control process of S800 mentioned earlier will be described.

At S802, a decision is made whether or not the spark-ignition timing flag FSPK is on. If the decision is NO, the process proceeds to S804 where the spark retard angle $\psi$ is set to 0, and with this step, the process is finished tentatively. Or, if the decision is YES, the process proceeds to S806.

Figure 22A:
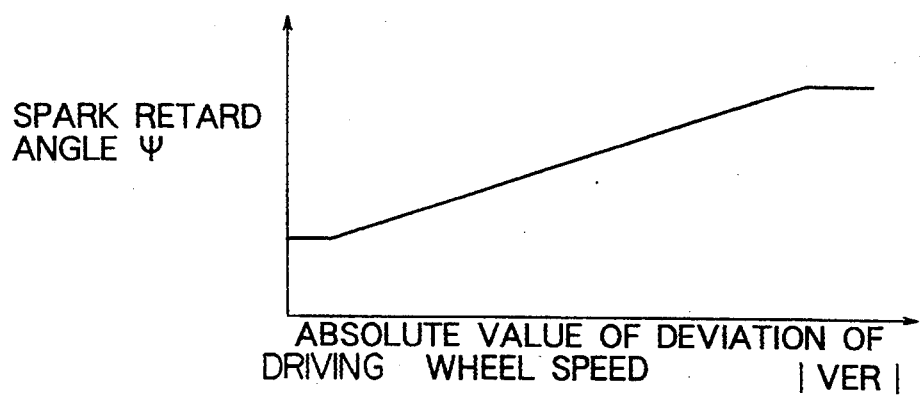
FIG. 22A is a diagram showing spark retard angle in relation to an absolute value of deviation of the driven wheel speed in the embodiment.

At S806, as shown in the graph of FIG. 22A, the spark retard angle $\psi$ is obtained by multiplying the absolute value |VER| of the difference of the driving wheel speeds by a coefficient $K\psi$.

Figure 22B:
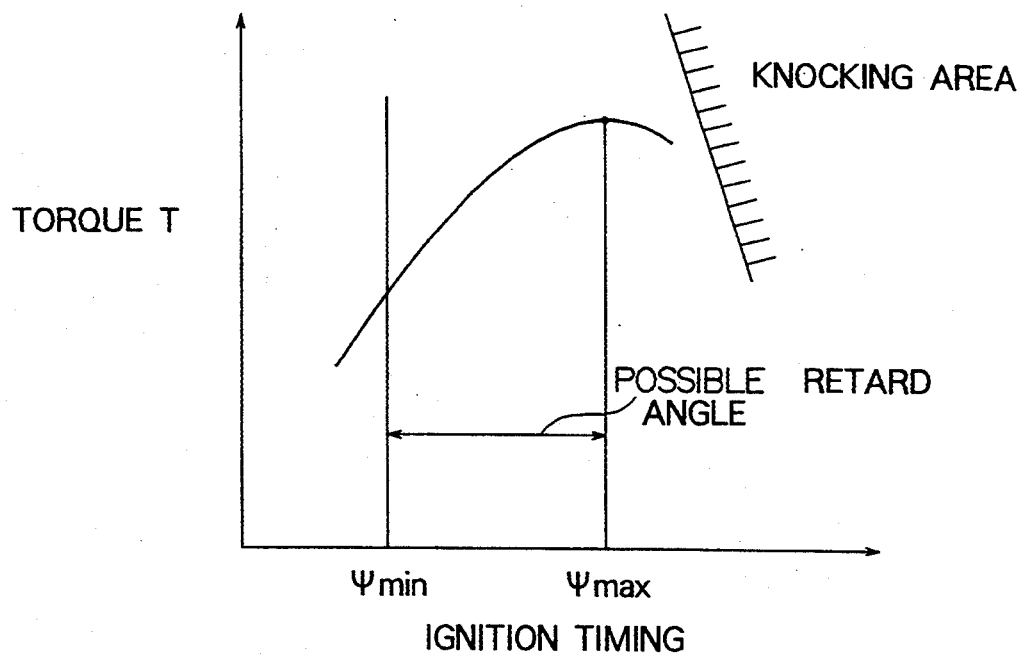
FIG. 22B is a diagram showing a relation between the spark retard angle and torque.

At S808, the spark regard angle $\psi$ is compared with the maximum value $\psi$max of the spark retard angle shown in FIG. 22B.

If at S808 a decision is made that the spark retard angle $\psi$ is larger than the absolute value $\psi$max of the spark retard angle, the process proceeds to S812 where the maximum value $\psi$max is set as the spark retard angle, and then process advances to S816. On the other hand, if a decision is made that the spark retard angle $\psi$ is smaller than or equal to the maximum value $\psi$max of the spark retard angle, the process moves on to S810.

At S810, the spark retard angle $\psi$ is compared with the minimum value $\psi$min of the spark retard angle shown in FIG. 22B.

If at S810 a decision is made that the spark retard angle $\psi$ is less than the minimum value $\psi$min of the spark retard angle, the process moves on to S814 where the minimum value $\psi$min is set as the spark retard angle $\psi$, then proceeds to S816. On the other hand, if a decision is made that the spark retard angle $\psi$ is greater than or equal to the minimum value $\psi$min of the spark retard angle, the process proceeds to S816.

At S816, the ignition timing is retarded by the set spark retard angle $\psi$, and with this step, the process is finished tentatively.

In other words, the steps S802 to S816 constitute the process for adjusting the ignition timing by controlling the retard angle $\psi$ of the ignition timing so as to be in a predetermined range according to the difference VER between the target and the actual driving wheel speeds.

Figure 23:
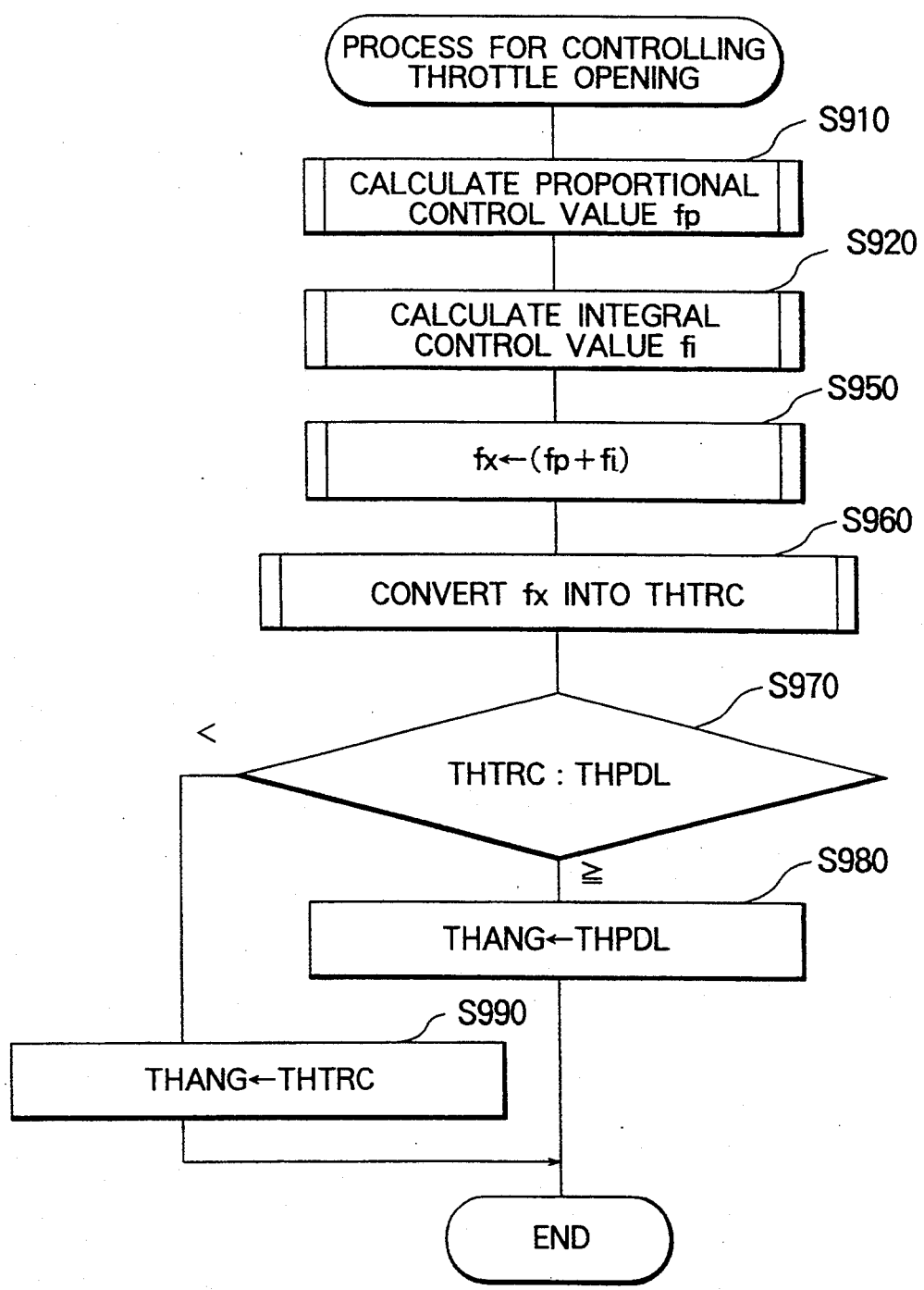
FIG. 23 is a flowchart showing a process of throttle control.

With reference to the flowchart in FIG. 23, description will next be made of the throttle control process of S900 mentioned earlier. The subroutines S910, S920 and S960 will be described in detail when reference is made to FIGS. 24, 25 and 26.

At S910 in FIG. 23, a drive torque (proportional control value) fp by proportional control, which will be described later, is obtained, and at S920, a drive torque (integral control value) fi by integral control, which will be described later, is obtained.

At S950, a drive torque (PI control value) fx by PI(-proportional integral) control is obtained by adding the proportional control value fp with the integral control value fi.

At S960, the PI control value fx is converted into a throttle opening angle THTRC for traction control which will be described later.

At S970, the throttle opening angle THTRC is compared with the target opening angle THPDL, and if the throttle opening angle THTRC is greater than or equal to the target opening angle THPDL, the process proceeds to S980, or if the throttle opening angle THTRC is less than the target opening angle THPDL, the process advances to S990.

At S980, the target opening angle THPDL by accelerator operation is set as the final target throttle opening angle THANG. With this step, the process is finished tentatively.

On the other hand, at S990, the throttle opening angle THTRC is set as the final target throttle opening angle THANG, and with this step, the process is finished tentatively.

In other words, the operations S910 to S960 constitute the process for finding the throttle opening angle THTRC for performing traction control through proportional and integral control. The subsequent operations S970 to S990 constitute the process for setting the smaller of the accelerator operating amount (target opening angle THPDL by accelerator operation) and the target opening angle for traction control (throttle opening angle THTRC) is set as the final throttle opening angle THANG.

Figure 24:
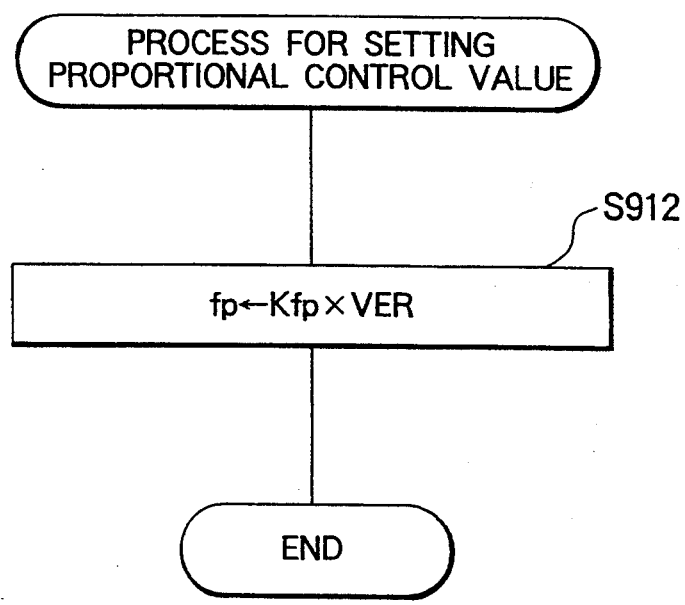
FIG. 24 is a flowchart showing a process for setting a proportional control value.

The subroutine for setting the proportional control value at S910 will be described with reference to the flowchart in FIG. 24.

At S912, a product of the difference VER between the target and the actual driving wheel speeds and a predetermined proportional control constant $Kf_p$ is set as the proportional control value $f_p$, and with this step, the process is finished tentatively.

Figure 25:
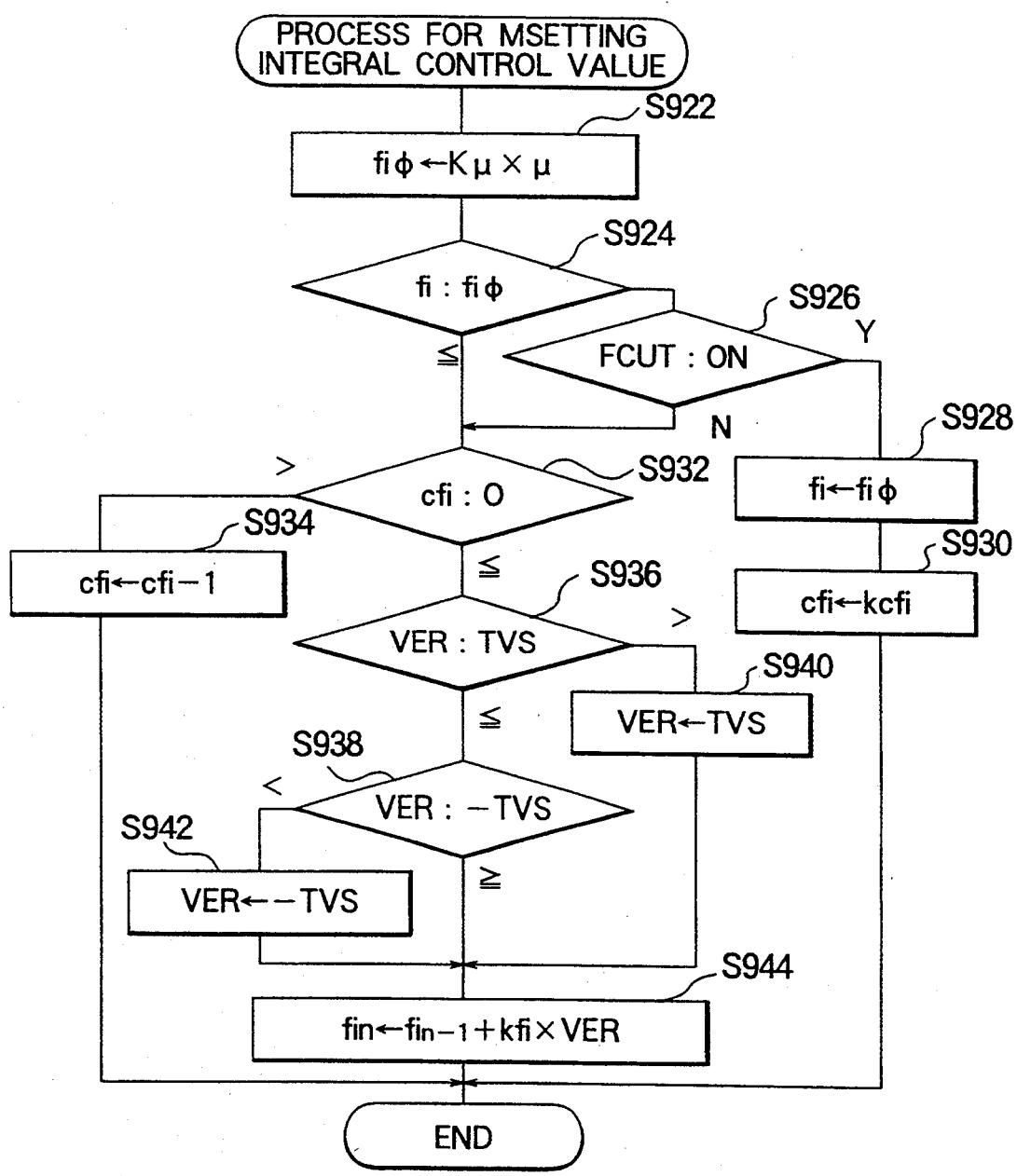
FIG. 25 is a flowchart showing a process for setting an integration control value.

The subroutine for setting the integral control value at S920 will be described with reference to the flowchart in FIG. 25.

At S922, an initial value $fi\phi$ of the integral control value is set by multiplying the friction coefficient $\mu$ of road surface by a constant $K\mu$ corresponding to the earth pressing force W.

At S924, in order to always select a small value, a comparison is made between an integral control value fi which has been set up to this moment and the initial value $fi\phi$, and if the integral control value fi is greater than the initial value $fi\phi$, the process proceeds to S926, or if the integral control value fi is smaller than or equal to the initial value $fi\phi$, the process moves on to S932.

At S926, a decision is made whether or not the fuel cut flag FCUT is on, and if the decision is YES, the process proceeds to S928, or if the decision is NO, the process advances to S932.

At S928, the initial value $fi\phi$ is set as the integral control value fi, then at S930, to correct the delay time, a predetermined counter value kcfi is set as the counter value cfi, and with this setting, the process is finished tentatively.

On the other hand, at S932, the counter value cfi is compared with 0, and if a decision is made that the counter value cfi is larger than 0, the process proceeds to S934, or if a decision is made that the counter value cfi is smaller than or equal to 0, the process proceeds to S936.

At S934, the counter value is decremented by one, in other words, the initial value $fi\phi$ is maintained for a time corresponding to the predetermined counter value kcfi, with which operation, the process is finished tentatively. Thus, an actual counting operation is performed by the steps S932 and S934.

On the other hand, at S936, in order to provide a guard for control on the safer side, the difference VER between the target and the actual driving wheel speeds is compared with the target slip speed TVS. If a decision is made that the difference VER in driving wheel speed is smaller than or equal to the target slip speed TVS, the process proceeds to S938, or if a decision is made that the difference VER in driving wheel speed is greater than the target slip speed TVS, the process advances to S940.

At S940, since the decision at S936 was that the target slip speed TVS is smaller, this small target slip speed TVS is set as the difference VER in driving wheel speed, and the process proceeds to S944.

On the Other hand, at S938, since the decision at S936 was that the difference VER in driving wheel speed is smaller than or equal to the target slip speed TVS, in order to check the absolute magnitude, the difference VER in driving wheel speed is compared with a negative target slip speed (−TVS). If at S938 the difference VER in driving wheel speed is less than the negative target slip speed (−TVS), the process proceeds to S942, or if the difference VER in driving wheel speed is greater than or equal to the negative target slip speed (−TVS), the process advances to S944.

At S942, the negative target slip speed (−TVS) is set as the difference VER in driving wheel speed, and the process proceeds to S944.

At S944, a new integral control value $fi_n$ is obtained by adding the previous integral control value $fi_{n-1}$ to a product of the difference VER in driving wheel speed and the current integral control value kfi.

In other words, the operations of S922 to S944 constitute the process for obtaining an adequate integral control value fi by always selecting a smaller value for the integral control value while providing a guard on the safe side by using the difference VER in driving wheel speed and the target slip speed.

Figure 26:
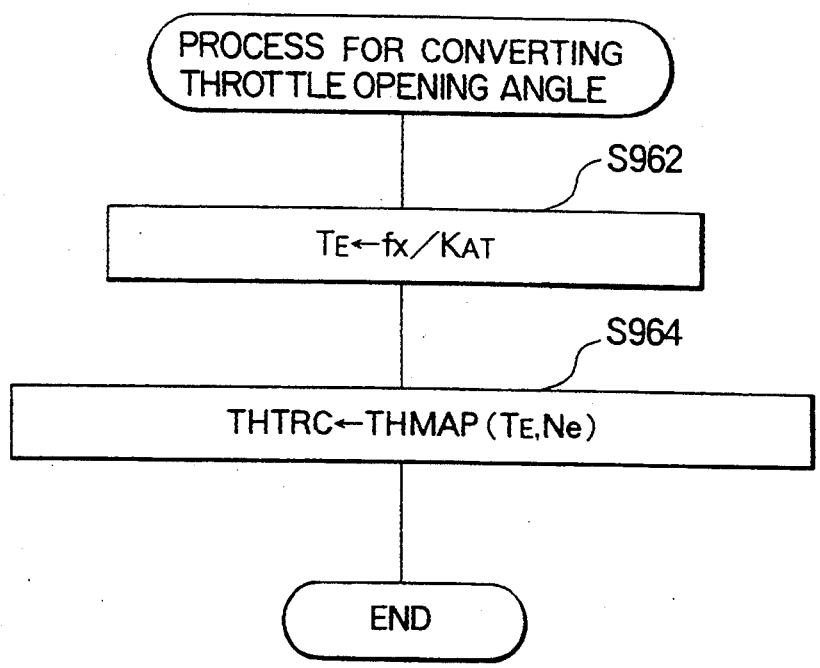
FIG. 26 is a flowchart showing a process for converting a throttle opening angle.

The process for converting the throttle opening angle of S960 mentioned earlier will be described with reference to the flowchart in FIG. 26.

At S962, a value obtained by diving the PI control value fx by the A/T correction factor $K_{AT}$ is set as the engine torque $T_E$.

Figure 27:
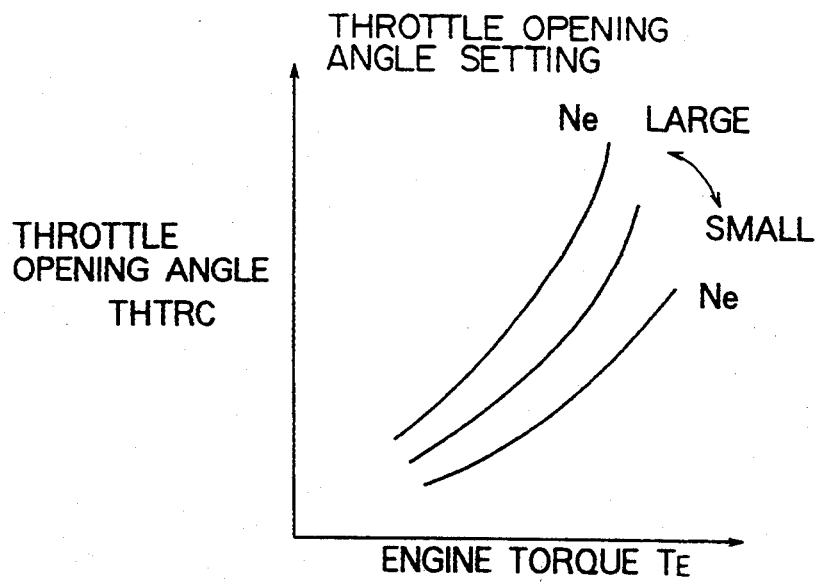
FIG. 27 is a graph corresponding to a map for setting the throttle opening angle.

At S964, the throttle opening angle THTRC is obtained based on the engine number of revolutions Ne and the engine torque $T_E$ by using a map THMAP for setting the throttle opening angle THTRC mentioned earlier as shown in FIG. 27. With this operation, the process is finished tentatively. In FIG. 27, under the same engine torque $T_E$, the larger the engine number of revolutions Ne, the greater the throttle opening angle THTRC becomes.

In short, the operations of S962 to S964 constitute the process for obtaining the engine torque $T_E$ by correcting the drive torque fx by PI control and based on this engine torque $T_E$, additionally obtaining the throttle opening angle THTRC.

FIG. 28 shows the vehicle operation and the like resulting from control such as described above.

As shown in FIG. 28, when the accelerator position is adjusted by the driver, the speed of the driving wheels varies by a large amount. From the speeds of the driving wheels and the driven wheels (vehicle speed), a decision is made whether or not a slip is occurring, and according to a result of decision, flags are set to direct a fuel cut or ignition timing control to be executed. When a slip is not occurring, the target throttle opening angle is controlled according to the accelerator pushing amount Ap. On the other hand, when a slip is occurring, the target driving wheel speed is calculated so that the driving wheel speed stays within the range of a predetermined slip ratio S when a wheel slip occurs, and the driving wheels are controlled so as to run at this target driving wheel speed.

Specifically, in this embodiment, when a slip occurs, the friction coefficient μ of road surface is estimated, and according to the estimated friction coefficient μ of the road surface, the throttle opening, fuel supply quantity, spark-ignition timing, etc. are controlled, traction control with superb response is implemented, and an excessive wheel slip is prevented. According to this embodiment, it is possible to provide a vehicle slip control system for use in a vehicle which makes compatible a stable running performance and an excellent acceleration property.

In a test for checking the friction coefficient μ estimated by the above-mentioned procedure, it was found that the estimated accuracy (dispersion from a true value) is very high at $3\sigma \leq 0.1$ both on icy and snowy roads.

(Experiment)

A control experiment was conducted by using a car on which a slip control system in this embodiment is actually mounted and a car without this system as a comparative example.

Figure 29A:
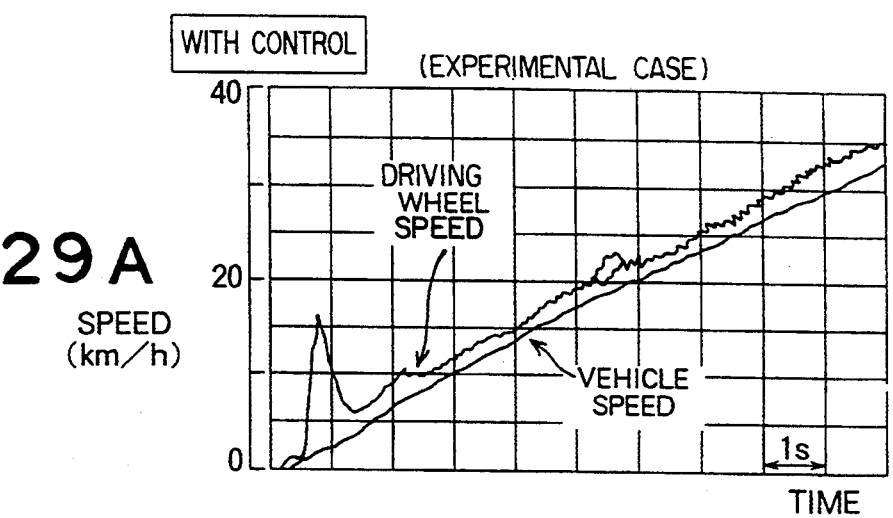
FIG. 29A shows experimental results obtained when a vehicle slip control system of this embodiment is used.
Figure 29B:
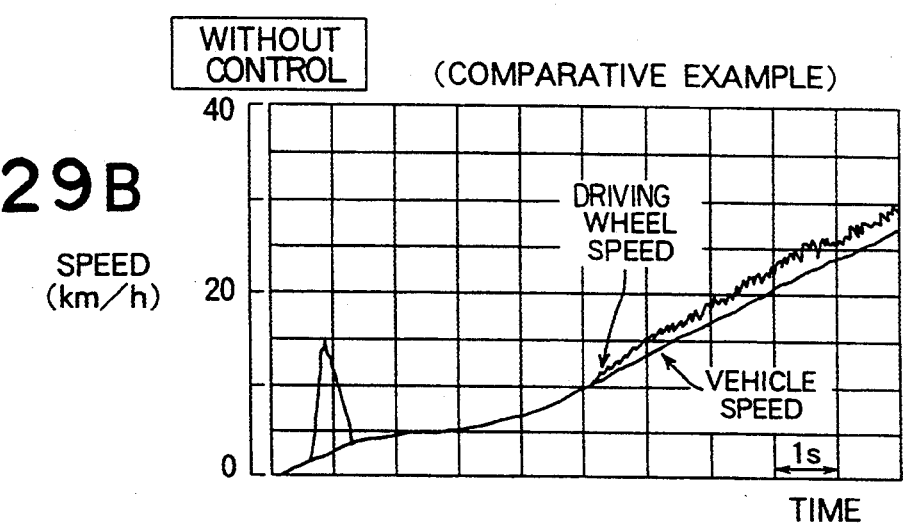
FIG. 29B shows experimental results obtained when a conventional vehicle slip control system is used.
Figure 29C:
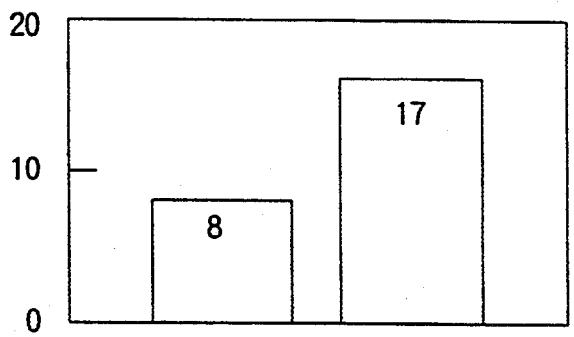
FIG. 29C compares acceleration of the vehicle slip control systems of this embodiment and of the prior art.

In this experiment, how acceleration progresses was examined on those cars from the condition that the accelerator is pushed. The experimental results are shown in FIGS. 29A to 29C. As is apparent from those figures, on the car of this first embodiment shown in FIG. 29A, the speed of the car increases with a substantially constant gradient (rate), which is desirable, whereas in the comparative example shown in FIG. 29B, the acceleration is at a low rate for a certain period from the start of acceleration, which is undesirable.

FIG. 29C shows the acceleration property for four seconds from the start of acceleration. In this embodiment, the acceleration property is as high as 17, but in the comparative example, the acceleration property is low as 8, which is not appropriate.

A second embodiment of the present invention will next be described.

This second embodiment is a simplified version of the first embodiment described above to make it easy to estimate the friction coefficient μ, and in the second embodiment, the operations other than the estimation of the friction coefficient μ are the same as in the first embodiment, so that their descriptions will be omitted.

In the second embodiment, the friction coefficient μ of road surface is estimated easily based on a time period from when the accelerator begins to be pushed until a wheel slip occurs and on the accelerator operating speed.

Figure 4A:
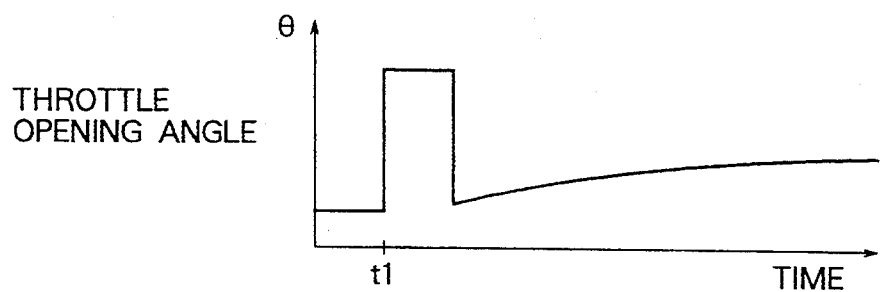
FIG. 4A is a diagram showing a variation of throttle opening angle at starting.
Figure 4B:
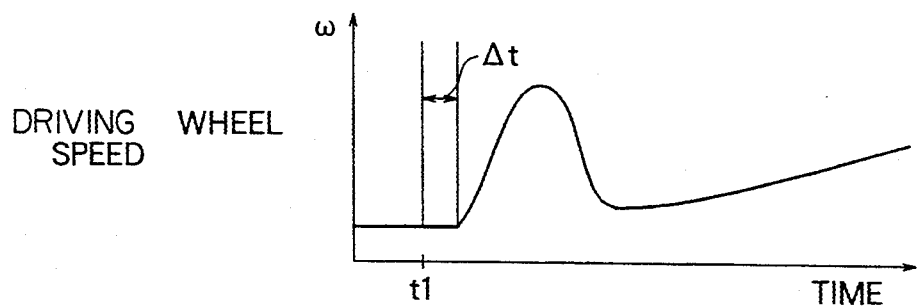
FIG. 4B is a diagram showing a variation of driving wheel speed at starting.
Figure 4C:
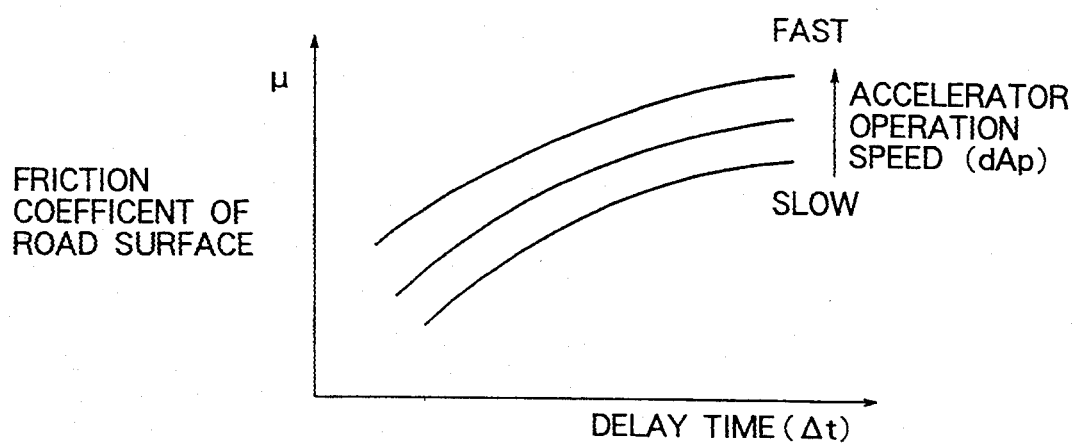
FIG. 4C is a diagram showing a relation between a driven response delay time of the driving wheels and a friction coefficient of road surface at starting.

FIGS. 4A and 4B represent changes in the throttle opening angle and the driving wheel speed at starting, while FIG. 4C represents a relation between the response delay time of the driving wheels and the friction coefficient of the road surface at starting.

As is obvious from those figures, there is a definite relation (with presence of a delay time Δt) between the throttle opening angle θ and the driving wheel speed ω. Further, there is a definite relation between the delay time Δt and the friction coefficient μ of the road surface with an accelerator operating speed dAp as a parameter. Therefore, the friction coefficient μ of road surface is estimated based on the delay time Δt and the accelerator operating speed dAp.

Thus, the estimation process of the friction coefficient $\mu$ is not so burdensome, so that control can be performed quickly, which is an advantage of the second embodiment.

Next, a third embodiment of the present invention will be described.

The third embodiment is another simplified version of the first embodiment, which makes it easy to estimate the friction coefficient $\mu$, and in the third embodiment, the operations other than the estimation of the friction coefficient $\mu$ are the same as in the first embodiment, and hence, their descriptions will be omitted.

In the third embodiment, a height sensor 60 is installed on the driving wheel side, and the output from the height sensor is input to ECU 50 through the input port 50e. The sinkage x of the vehicle during acceleration is detected with the height sensor 60, and from the detected sinkage x, the friction coefficient $\mu$ of the road surface is estimated.

To be more concrete, when the change rate of the sinkage x during acceleration of the vehicle is substantially constant, the dashpot effect is practically negligible, and therefore, the squat force Ws is expressed by the equation (11) mentioned earlier.

Using the equation (15) obtained by substituting the equation (11) into the equation (14), the friction coefficient $\mu$ is estimated.

In the third embodiment, the graph in FIG. 30 representing the equation (15) is transformed into a map, and directly from this map, the friction coefficient $\mu$ is estimated.

Therefore, in the third embodiment, the estimation process of the friction coefficient $\mu$ is not so burdensome, and a resulting advantage is a quick control operation.

In control in the first to the third embodiments, when a wheel slip occurs, it is possible to control the amount of slip in cornering or adjust the acceleration in delicate way by varying the target slip ratio S according to the pushing amount of the accelerator. Therefore, a noteworthy feature is the improvement in safety and drivability on a road with a low friction coefficient $\mu$.

The present invention is not limited to the above-mentioned embodiments, but obviously many modifications and variations of the present invention are possible without departing from the spirit and scope of those embodiments.

We claim:

1. A vehicle slip control system, mounted on a vehicle which runs by rotating driving wheels in contact with a road surface, said system being for controlling a slip of the driving wheels and comprising:

friction calculation means for calculating a friction coefficient of the road surface by taking into account a variation in a road pressing force of the driving wheels, said friction calculation means including squat force detecting means for detecting a squat force varying a load to said driving wheels when accelerating said vehicle, wherein the friction coefficient is calculated based on the squat force;

slip control means for controlling the slip of the driving wheels in accordance with the friction coefficient of road surface calculated by said friction calculation means;

drive torque detecting means for detecting a drive torque of said driving wheels, and acceleration detecting means for detecting an acceleration of said driving wheels, wherein said squat force detecting means calculates the squat force based on the detected drive torque and the detected acceleration of said driving wheels.

2. A vehicle slip control system mounted on a vehicle which runs by rotating driving wheels in contact with a road surface, said system being for controlling a slip of the driving wheels and comprising:

friction calculation means for calculating a friction coefficient of the road surface by taking into account a variation in a road pressing force of the driving wheels, said friction calculation means including squat force detecting means for detecting a squat force varying a load to said driving wheels when accelerating said vehicle, wherein the friction coefficient is calculated based on the squat force;

slip control means for controlling the slip of the driving wheels in accordance with the friction coefficient of road surface calculated by said friction calculation means; and drive torque detecting means for detecting a drive torque of said driving wheels, and acceleration detecting means for detecting an acceleration of said driving wheels, wherein said squat force detecting means calculates the squat force based on the detected drive torque and the detected acceleration of said driving wheels;

wherein said squat force detecting means calculates the squat force Ws by using the following equation:

$$Ws = h(T - I \cdot d\omega)/L \cdot r$$

where Ws is a squat force, h is a height up to the center of gravity, T is a drive torque, I is the moment of inertia in the peripheral area of the tire, $d\omega$ is the acceleration of said driving wheels, L is a distance from the center of gravity to the axle, and r is a radius of a wheel.

3. A vehicle slip control system mounted on a vehicle which runs by rotating driving wheels in contact with a road surface, said system being for controlling a slip of the driving wheels and comprising:

friction calculation means for calculating a friction coefficient of the road surface by taking into account a variation in a road pressing force of the driving wheels, said friction calculation means including squat force detecting means for detecting a squat force varying a load to said driving wheels when accelerating said vehicle, wherein the friction coefficient is calculated based on the squat force;

slip control means for controlling the slip of the driving wheels in accordance with the friction coefficient of road surface calculated by said friction calculation means; and drive torque detecting means for detecting a drive torque of said driving wheels, and acceleration detecting means for detecting an acceleration of said driving wheels, wherein said squat force detecting means calculates the squat force based on the detected drive torque and the detected acceleration of said driving wheels;

wherein said friction calculation means calculates the friction coefficient $\mu$ of the road surface by using the following equation:

$$\mu = (T - I \cdot d\omega)/((Wo + Ws) \cdot r)$$

where Ws is a squat force, Wo is a static load, T is a drive torque, I is the moment of inertia related to tires, $d\omega$ is the acceleration of said driving wheels, and r is a radius of a wheel.

4. A vehicle slip control system mounted on a vehicle which runs by rotating driving wheels in contact with a road surface, said system being for controlling a slip of the driving wheels and comprising:

friction calculation means for calculating a friction coefficient of the road surface by taking into account a variation in a road pressing force of the driving wheels;

slip control means for controlling the slip of the driving wheels in accordance with the friction coefficient of road surface calculated by said friction calculation means;

drive torque detecting means for detecting a drive torque of said driving wheels; and acceleration detecting means for detecting the acceleration of said driving wheels;

wherein said friction calculation means calculates the friction coefficient $\mu$ of the road surface by using the following equation:

$$\mu = (T - I \cdot d\omega)/(Wo \cdot r + (h/L)(T - I \cdot d\omega))$$

wherein Wo is a static load, T is a drive torque, I is the moment of inertia related to tires, $d\omega$ is the acceleration of said driving wheels, r is a radius of a wheel, h is a height up to the center of gravity, and L is a distance from the center of gravity to the axle.

5. The vehicle slip control system according to claim 4, wherein said acceleration detecting means includes a rotation speed sensor for detecting the rotation speed of said driving wheels, acceleration calculating means for calculating a difference of the speed detected by said rotation speed sensor as acceleration, and filter means for removing an unsprung natural frequency component by applying a filter process to the acceleration calculated by said acceleration calculating means, wherein the acceleration having received said filter process by said filter means is output.

6. The vehicle slip control system according to claim 5, where said filter means removes said unsprung natural frequency $f_B$ owing to the tires or the like set by the following equation:

$$f_B = (k_2/m_2)^{1/2}/2\pi$$

wherein $k_2$ is a tire vertical spring constant and $m_2$ is an unsprung load.

7. A vehicle slip control system mounted on a vehicle which runs by rotating driving wheels in contact with a road surface, said system being for controlling a slip of the driving wheels and comprising:

friction calculation means for calculating a friction coefficient of the road surface by taking into account a variation in a road pressing force of the driving wheels, said friction calculation means including squat force detecting means for detecting a squat force varying a load to said driving wheels when accelerating said vehicle, wherein the friction coefficient is calculated based on the squat force, said squat force detecting means including a height sensor for detecting a sinkage of the suspension of the vehicle, and calculating means for calculating the squat force based on the sinkage detected by said height sensor;

slip control means for controlling the slip of the driving wheels in accordance with the friction coefficient of road surface calculated by said friction calculation means;

wherein said friction calculation means calculates the friction coefficient of the road surface by the following equation:

$$\mu = L/h \, (1 + Wo/Ws)$$

wherein Ws is the squat force, Wo is a static load, h is a height up to the center of gravity, and L is a distance from the center of gravity to the axle.

8. A vehicle slip control system mounted on a vehicle which runs by rotating driving wheels in contact with a road surface, said system being for controlling a slip of the driving wheels and comprising:

friction calculation means for calculating a friction coefficient of the road surface by taking into account a variation in a road pressing force of the driving wheels, said friction calculation means including a height sensor for detecting the sinkage of the suspension of the vehicle, and calculating means for calculating the friction coefficient of road surface based on the sinkage detected by said height sensor;

slip control means for controlling the slip of the driving wheels in accordance with the friction coefficient of road surface calculated by said friction calculation means;

wherein said calculating means calculates the friction coefficient u of road surface bs the following equation:

$$\mu = L/h(1 + Wo/(k\,x - Wo))$$

wherein k is a spring constant of the suspension, x is a sinkage, Ws is a squat force, Wo is a static load, h is a height up to the center of gravity, and L is a distance from the center of gravity to the axle.

9. The vehicle slip control system according to claim 8, wherein said friction calculation means calculates the friction coefficient $\mu$ of the road surface from a map formed based on the above-mentioned equation and by using the sinkage detected by said height sensor as a parameter.

* * * * *